United States Patent
Ohki et al.

(10) Patent No.: US 7,450,144 B2
(45) Date of Patent: Nov. 11, 2008

(54) IMAGE FORMING APPARATUS

(75) Inventors: Yozo Ohki, Wakayama (JP); Kazuhiro Yoshida, Wakayama (JP)

(73) Assignee: Noritsu Koki Co., Ltd., Wakayama (JP)

(*) Notice: Subject to any disclaimer, the term of this patent is extended or adjusted under 35 U.S.C. 154(b) by 274 days.

(21) Appl. No.: 11/385,746

(22) Filed: Mar. 22, 2006

(65) Prior Publication Data

US 2006/0215010 A1 Sep. 28, 2006

(30) Foreign Application Priority Data

Mar. 25, 2005 (JP) .............................. 2005-088451

(51) Int. Cl.
- B41J 2/47 (2006.01)
- B41J 2/385 (2006.01)
- H04N 1/21 (2006.01)
- G03G 15/00 (2006.01)

(52) U.S. Cl. ........................ 347/251; 347/129; 347/131; 347/132; 347/252; 347/253; 358/302; 399/38

(58) Field of Classification Search ....................... None
See application file for complete search history.

(56) References Cited

U.S. PATENT DOCUMENTS

| | | | |
|---|---|---|---|
| 4,868,675 A | * | 9/1989 | Joosten et al. ............... 358/296 |
| 5,619,242 A | * | 4/1997 | Haneda et al. ............... 347/131 |
| 5,651,017 A | * | 7/1997 | Genovese ................. 372/38.02 |
| 5,663,814 A | | 9/1997 | Hada et al. |
| 6,803,937 B2 | * | 10/2004 | Hirooka et al. .............. 347/236 |

FOREIGN PATENT DOCUMENTS

JP 07-203208 A 8/1995

* cited by examiner

*Primary Examiner*—Matthew Luu
*Assistant Examiner*—Kendrick X Liu
(74) *Attorney, Agent, or Firm*—Global IP Counselors, LLP

(57) ABSTRACT

A photo-printing system includes a laser exposure unit, a reference clock generation unit, an image input unit, and a controller. The image input unit receives first pixel data and second pixel data to be expressed after the first pixel in accordance with image data. In a first control, the first and second pixels are scanned for exposure in a laser emission region state wherein each of the scan-start timings of the first and second pixels are controlled in accordance with a reference clock. In a second control, the first pixel is scanned for exposure in a nonlinear light emission region state, and the second pixel having a density equal to or lower than a predetermined density is scanned for exposure in the laser emission region state, the scan-start timing of the second pixel is advanced with respect to the first control.

10 Claims, 10 Drawing Sheets

IMAGE FORMING APPARATUS

CROSS-REFERENCE TO RELATED APPLICATIONS

This application claims priority under 35 U.S.C. §119 to Japanese Patent Application No. 2005-088451. The entire disclosure of Japanese Patent Application No. 2005-088451 is hereby incorporated herein by reference.

BACKGROUND OF THE INVENTION

1. Field of the Invention

The present invention relates to an image forming apparatus, particularly to an image forming apparatus to express gray-scale in accordance with image data.

Vehicles are typically provided with various types of decorative trim portions, such as real wood finishes on doors or radio bezels with chrome laminated film trim. Such trim portions are not noticeable in darker conditions.

2. Background Data

Typically, conventional photography printers form an image by irradiating a plurality of pixels that form a photoreceptor with a laser, i.e., scanning exposure in accordance with an original image. For example, in a photography printer shown below in Japan Unexamined Patent Application Publication H07-203208 (published on Aug. 4, 1995), a constant interval of scanning time for each pixel is sufficiently ensured by assigning one frequency to one pixel for the scanning exposure. In this photography printer, when scanning exposure is performed in accordance with an original image, shades of gray for each pixel are expressed by adjustments such as increasing exposure light intensity of the laser or extending the exposure time to express dark color, or reducing exposure light intensity of the laser or shortening the exposure time to express light color.

However, in some cases, taking into account the characteristics of the laser, one must wait for a rise time to elapse in order to attain the laser intensity necessary to express a certain color.

For example, in order to express white color, a laser exposure device is shifted to a nonlinear light emission region (standby state), in which the device just exposes light which does not have laser characteristics. On the other hand, in order to express chromatic color, the device scans for exposure in a laser emission region, emitting light having laser characteristics. Then, when the chromatic color is expressed after the white color is expressed, one must wait for the laser emission device to shift from the nonlinear light emission region to the laser emission region.

If the scanning time for one pixel is sufficiently ensured as in the conventional photography printer, the rise time does not matter. However, in order to increase the speed of image formation, the effects due to the rise time cannot be ignored because the scanning time for one pixel is shortened. As a result, it is difficult to maintain good reproducibility of the original image when increasing the speed of image formation, because the scanning time for one pixel is shortened so that a sufficient amount of exposure cannot be ensured.

In view of the above, there exists a need for an image forming apparatus which overcomes the above-mentioned problems in the prior art. This invention addresses this need in the prior art as well as other needs, which will become apparent to those skilled in the art from this disclosure.

SUMMARY OF THE INVENTION

It is an object of the present invention to provide an image forming apparatus which can maintain good image reproducibility, while improving the speed of image formation.

According to a first aspect of the present invention, an image forming apparatus comprises a laser exposure unit, a reference clock generation unit, an accepting unit, and a control unit. The laser exposure unit scans for exposure in a nonlinear light emission region state and in a laser emission region state. The reference clock generation unit generates a reference clock as a reference for the timing of the scanning exposure. The accepting unit accepts data on a first pixel to be expressed according to image data and data on a second pixel to be expressed after the first pixel. It is noted that the second pixel indicates a pixel to be expressed after the first pixel, and the order to accept the data on each pixel does not affect the definition. The control unit selectively performs a first control and a second control to control the scan-start timing. The control unit performs the first control to control scan-start timing of the first pixel and the second pixel in accordance with the reference clock if scanning exposure is performed on the first pixel and the second pixel in the laser emission region state, and the second control to advance scan-start timing of the second pixel with respect to the first control if scanning exposure is performed on the first pixel in the nonlinear light emission region state, and scanning exposure is performed on a second pixel having a density equal to or lower than a predetermined density in the laser emission region state.

It should be noted that the laser exposure unit can shift between the nonlinear light emission region state and the laser emission region state, and requires a rise time in order to rise from the nonlinear light emission region state to the laser emission region state. The rise time herein indicates the time in which the laser exposure unit is in the nonlinear light emission region state, not in the laser emission region state, when the laser exposure unit is shifted from the nonlinear light emission region state to the laser emission region state.

In a conventional image forming apparatus, sufficient scanning time is assigned to one pixel, so an image is formed according to constant periods. Therefore, although it is necessary to wait for the rise time to elapse in order to express a certain color because of the characteristics of the laser, it does not matter much. However, in order to increase the speed of image formation, the effects of the rise time increase, so that it becomes difficult to get enough exposure, which may not maintain good image reproducibility.

In contrast, in the image formation apparatus according to the first aspect of the present invention, when dealing with the first pixel and the second pixel whose pixel data was accepted by the accepting unit, the control unit controls the scan-start timing by the laser exposure unit in accordance with the reference clock, utilizing the first control and the second control.

In this apparatus, if both of the first pixel and the second pixel are scanned for exposure in the laser emission region state, the control unit performs the first control to control the scan-start timing in accordance with the reference clock, without taking into account the rise time of the laser exposure unit. On the other hand, if scanning exposure is performed on the first pixel in the nonlinear light emission region state, and then the second pixel is scanned for exposure in the laser emission region state, the control unit performs the second control to advance the scan-start timing of the second pixel with respect to the performance of the first control, taking into account the rise time of the laser exposure unit. In other words, in the second control, the rise time necessary for preparation of the expression of the second pixel is started earlier.

First, the above-mentioned rise time of the laser exposure unit indicates the elapsed time during which the laser exposure unit is in the nonlinear light emission region state, not in the laser emission region state, when the unit is shifted from the nonlinear light emission region state to the laser emission region state. As a result, an initial part or the whole of the rise time passing in the nonlinear light emission region state elapses simultaneously with the scanning time for the first pixel when scanning exposure is performed in the nonlinear light emission region state. In other words, although the scanning time for the first pixel and time for preparation of the second pixel elapse separately in the conventional art, portions of the times overlap or elapse simultaneously. As a result, it is possible to prepare to express the second pixel while expressing the first pixel, so that the scanning time for the second pixel can be ensured even if the speed of image formation is increased.

Next, if scanning exposure is performed on the second pixel in the laser emission region state after scanning exposure is performed on the first pixel in the nonlinear light emission region state, the control unit performs the second control to advance the scan-start timing of the second pixel. As a result, the rise time finishes earlier. Accordingly, the exposure time can be ensured to express the second pixel, so that it is possible to ensure enough exposure to the second pixel, thereby maintaining good reproducibility of the second pixel.

As mentioned above, since the scanning time for the second pixel is ensured even if the speed of image formation is increased, good reproducibility of the second pixel is maintained. Accordingly, it is possible to maintain good image reproducibility even if the speed of image formation is increased.

According to a second aspect of the present invention, in the image formation apparatus according to the first aspect of the present invention, the control unit performs the second control to further advance the scan-start timing of the second pixel as the difference between the first pixel density and the second pixel density becomes smaller. It should be noted that density in this specification includes degrees of gradation, luminance, lightness, tonality, pixel color saturation, and these interrelated values.

In the laser characteristics, as the density differences are small between the first pixel to be expressed by scanning exposure in the nonlinear light emission region state and the second pixel to be subsequently expressed by scanning exposure in the laser emission region state, the rise time of the laser exposure unit becomes longer.

In contrast, in the image formation apparatus according to the second aspect, as the density difference between the first pixel and the second pixel becomes smaller, the control unit further advances the scan-start timing of the second pixel. As a result, it is possible to ensure a longer scanning time for the second pixel, even if the density difference between the first pixel and the second pixel is small, so that the rise time should be long.

Accordingly, even if the speed of image formation is increased when the density differences between the first pixel and the second pixel is small, it is possible to maintain good image reproducibility.

According to a third aspect of the present invention, in the image formation apparatus according to the first or second aspect of the present invention, the apparatus further comprises a delay clock generation unit. The delay clock generation unit generates a delay clock at timing delayed from generation timing of the reference clock. The control unit controls the delay clock generation unit to generate the delay clock which has less degree of delay from the generation timing of the reference clock when the second pixel is expressed in the second control.

In this apparatus, it is possible to form an image by assigning different scanning times to each pixel while receiving the image data because the apparatus utilizes the delay clock generated by the delay clock generation unit. Furthermore, it is possible to adjust the scanning times based on each pixel because the control unit can adjust degree of delay caused by the delay clock.

Accordingly, when image formation is performed while receiving the image data, reproduction certainty of each pixel is improved.

According to a fourth aspect of the present invention, in the image formation apparatus according to any of first to third aspects of the present invention, the apparatus further comprises a decision unit, a delay adjustment unit, and a buffer. The decision unit decides whether or not the density difference between density on the basis of first pixel data and density on the basis of second pixel data is within a predetermined value. The delay adjustment unit adjusts delay degree of the delay clock in accordance with outcome of decision by the decision unit. The buffer temporarily stores first pixel data and the second pixel data. For example, the decision unit and the delay adjustment unit may be included in the control unit.

In this apparatus, the decision unit decides the density difference between pixels, and the delay adjustment unit adjusts delay degree in accordance with outcome of decision by the decision unit such as the density differences. The buffer temporarily stores pixel data while the decision unit and the delay adjustment unit perform the operations.

As a result, it is possible to ensure process time for the decision unit and the delay adjustment unit because the buffer temporarily stores the pixel data to ensure time.

According to a fifth aspect of the present invention, in the image formation apparatus according to any of the first to fourth aspects of the present invention, the laser exposure unit includes at least a RED laser exposure unit, a GREEN laser exposure unit, and a BLUE laser exposure unit. In a case of performing scanning exposure by at least one of the exposure units in the laser emission region state and shifting other exposure unit from the nonlinear light emission region state to the laser emission region state that performs scanning exposure, the control unit performs the first control to control the scan-start timings of each of the first pixel and the second pixel by the other exposure unit in accordance with the reference clock when the other exposure unit performs scanning exposure on the first pixel and the second pixel in the laser emission region state, and performs the second control to advance the scan-start timing of the second pixel with respect to the first control if the other exposure unit performs scanning exposure on the first pixel in the nonlinear light emission region state and performs scanning exposure on the second pixel having a density equal to or lower than the predetermined density in the laser emission region state.

In this apparatus, at least three exposure units, the RED laser exposure unit, the GREEN laser exposure unit and the BLUE laser exposure unit, are provided. Even when any of the exposure units performs scanning exposure in the laser emission region state and the other exposure unit performs scanning exposure in the nonlinear light emission region state to the first pixel and performs scanning exposure in the laser emission region state to the second pixel having a density equal to or lower than the predetermined density, the other exposure unit starts the rise time necessary for preparation of the expression of the second pixel earlier. As a result, the exposure to the second pixel is sufficiently ensured, so that good reproducibility of the second pixel is maintained.

As mentioned above, when any of the exposure units performs scanning exposure in the laser emission region state, even if the speed of image formation is increased, it is possible to maintain good image reproducibility in the other exposure unit.

According to a sixth aspect of the present invention, an image formation apparatus comprises a laser exposure unit, a reference clock generation unit, an accepting unit, and a control unit. The laser exposure unit scans for exposure in a nonlinear light emission region state and in a laser emission region state for emitting laser. The reference clock generation unit generates reference clock as reference for timing of scanning exposure. The accepting unit accepts data on a first pixel to be expressed according to image data and data on a second pixel to be expressed after the first pixel. It is noted that the second pixel indicates a pixel to be expressed after the first pixel and the order to accept the data on each pixel does not affect the definition. The control unit selectively performs a first control and a second control to control the exposure light intensity of the laser exposure unit. The control unit performs the first control to control exposure light intensity of the laser exposure unit in accordance with first pixel data and second pixel data if scanning exposure is performed on the first pixel and the second pixel in the laser emission region state, and performs the second control to at least temporarily increase the exposure light intensity of the laser exposure unit to the second pixel with respect to the first control if scanning exposure is performed on the first pixel in the nonlinear light emission region state and scanning exposure is performed on the second pixel having a density equal to or lower than a predetermined density in the laser emission region state.

It should be noted that the laser exposure unit can be shifted between the nonlinear light emission region state and the laser emission region state, and has characteristics of needing a rise time to rise from the nonlinear light emission region state to the laser emission region state. The rise time in the present specification indicates time during which the laser exposure unit is in the nonlinear light emission region state, not in the laser emission region state, when the laser exposure unit is shifted from the nonlinear light emission region state to the laser emission region state.

In the conventional image forming apparatus, enough scanning time is assigned to one pixel, so an image is formed according to constant periods. Therefore, although it is necessary to wait for the rise time to elapse to express a certain color because of the characteristic of the laser, it does not matter much. However, in order to increase speed of image formation, the effects of the rise time increase, so that it becomes difficult to get enough exposure, which may not maintain good image reproducibility.

In contrast, in the image formation apparatus according to the sixth aspect of the present invention, when dealing with the first pixel and the second pixel whose pixel data is accepted by the accepting unit, the control unit controls the exposure light intensity of the laser exposure unit in accordance with the reference clock, utilizing the first control and the second control.

In this apparatus, if both of the first pixel and the second pixel are scanned for exposure in the laser emission region state, the control unit performs the first control to control the exposure light intensity of the laser exposure unit in accordance with first pixel data and the second pixel data, without taking into account the rise time of the laser exposure unit. On the other hand, if scanning exposure is performed on the first pixel in the nonlinear light emission region state, and then the second pixel having a density equal to or lower than the predetermined density is scanned for exposure in the laser emission region state, the control unit performs the second control to increase the exposure light intensity to the second pixel with respect to the performance of the first control taking into account the rise time of the laser exposure unit.

As a result, the control unit shortens time necessary for rising by performing the second control, when waiting for the rise time of the laser exposure unit to elapse in order to express the second pixel. Accordingly, reproducibility of the image data is maintained, because the effects of the rise time of the laser exposure unit are reduced, so that the exposure time necessary to express the second pixel is ensured.

Furthermore, as mentioned above, the control unit performs the second control to shorten the time necessary to rise so that the scanning time for the second pixel is shortened. Accordingly, even if the speed of image formation is increased, it is possible to respond to the speeding up by a shortened time necessary for rising.

As mentioned above, it is possible to maintain good image reproducibility even if the speed of image formation is increased, because good reproducibility of the second pixel is maintained while coping with the speeding up of image formation.

According to a seventh aspect of the present invention, in the image formation apparatus according to the sixth aspect of the present invention, the control unit performs the second control to further increase the exposure light intensity of the laser exposure unit to the second pixel as the difference between the first pixel density and the second pixel density becomes smaller.

In the laser characteristics, because the density difference is smaller between the first pixel to be expressed by scanning exposure in the nonlinear light emission region state and the second pixel to be subsequently expressed by scanning exposure in the laser emission region state, the rise time for the laser exposure unit becomes longer.

In the image formation apparatus according to the seventh aspect of the present invention, however, as the density difference between the first pixel and the second pixel becomes smaller, the control unit further increases the exposure light intensity of the laser exposure unit to express the second pixel.

Accordingly, it is possible to shorten the time during which the laser exposure unit is shifted from the nonlinear light emission region state to the laser emission region state in accordance with the density difference or density ratio. Consequently, the scanning time necessary to express the second pixel is further shortened. Accordingly, even if the density difference between the first pixel and the second pixel is small, it is possible to further increase the speed of image formation while maintaining good image reproducibility.

According to an eighth aspect of the present invention, in the forming apparatus according to the sixth or seventh aspect of the present invention, the laser exposure unit includes at least a RED laser exposure unit, a GREEN laser exposure unit, and a BLUE laser exposure unit. In a case of performing scanning exposure by at least one of the exposure units in the laser emission region state and shifting other exposure unit from the nonlinear light emission region state to the laser emission region state that performs scanning exposure, the control unit performs the first control to control the exposure light intensity of the other laser exposure unit in accordance with first pixel data and second pixel data when the other exposure unit performs scanning exposure on the first pixel and the second pixel in the laser emission region state, and performs the second control to at least temporarily increase the exposure light intensity of the other laser exposure unit on the second pixel with respect to the first control if the other exposure unit performs scanning exposure on the first pixel in the nonlinear light emission region state and performs scanning exposure on the second pixel having a density equal to or lower than the predetermined density in the laser emission region state.

In this apparatus, at least three exposure units, the RED laser exposure unit, the GREEN laser exposure unit and the BLUE laser exposure unit, are provided. Even when any of the exposure units performs scanning exposure in the laser emission region state and the other exposure unit performs scanning exposure in the nonlinear light emission region state to the first pixel and performs scanning exposure in the laser emission region state to the second pixel having a density equal to or lower than the predetermined density, the other exposure unit increases the exposure light intensity of the laser exposure unit to the second pixel with respect to the first control. As a result, the exposure to the second pixel is sufficiently ensured, so that good reproducibility of the second pixel is maintained.

As mentioned above, when any of the exposure units performs scanning exposure in the laser emission region state, even if the speed of image formation is increased, it is possible to maintain good image reproducibility in the other exposure unit.

According to a ninth aspect of the present invention, an image forming apparatus comprises a laser exposure unit, a reference clock generation unit, an accepting unit, and a control unit. The laser exposure unit scans for exposure in a nonlinear light emission region state and in a laser emission region state for emitting laser. The reference clock generation unit generates reference clock as reference for timing of scanning exposure. The accepting unit accepts data on a first pixel to be expressed according to image data and data on a second pixel to be expressed after the first pixel. It is noted that the second pixel indicates a pixel to be expressed after the first pixel and the order to accept the data on each pixel does not affect the definition. The control unit selectively performs a first control and a second control to control the scan-start timing. The control unit performs the first control to control scan-start timings of the first pixel and the second pixel in accordance with the reference clock and to control exposure light intensity of the laser exposure unit in accordance with first pixel data and second pixel data if scanning exposure is performed on the first pixel and the second pixel in the laser emission region state, and performs the second control to advance scan-start timing of the second pixel and to at least temporarily increase the exposure light intensity of the laser exposure unit on the second pixel with respect to the first control if scanning exposure is performed on the first pixel in the nonlinear light emission region state and scanning exposure is performed on a second pixel having a density equal to or lower than a predetermined density in the laser emission region state.

It should be noted that the laser exposure unit can be shifted between the nonlinear light emission region state and the laser emission region state, and has characteristics of needing a rise time to rise from the nonlinear light emission region state to the laser emission region state. The rise time in the present specification indicates the time during which the laser exposure unit is in the nonlinear light emission region state, not in the laser emission region state, when the laser exposure unit is shifted from the nonlinear light emission region state to the laser emission region state.

In the conventional image forming apparatus, enough scanning time is assigned to one pixel, so an image is formed according to constant periods. Therefore, although it is necessary to wait for the rise time to elapse to express a certain color because of the characteristic of the laser, it does not matter much. However, in order to increase speed of image formation, the effects of the rise time increase, so that it becomes difficult to get enough exposure, which may not maintain good image reproducibility.

In contrast, an image formation apparatus according to the ninth aspect of the present invention, when dealing with the first pixel and the second pixel whose pixel data was accepted by the accepting unit, the control unit controls the scan-start timing of the laser exposure unit in accordance with the reference clock, utilizing the first control and the second control. In addition, since the scan-start timing of the laser tends to be late due to the required rise time when expressing the second pixel (second control), the control unit increases the exposure light intensity of the laser exposure unit with respect to the first control.

In this apparatus, if both of the first pixel and the second pixel are scanned for exposure in the laser emission region state, the control unit performs the first control to control the scan-star timing in accordance with the reference clock without taking into account the rise time of the laser exposure unit and to control the exposure light intensity of the laser exposure unit in accordance with first pixel data and the second pixel data. On the other hand, if scanning exposure is performed on the first pixel in the nonlinear light emission region state, and then the second pixel is scanned for exposure in the laser emission region state, the control unit performs the second control to advance the scan-start timing of the second pixel and to at least temporarily increase the exposure light intensity of the laser exposure unit to the second pixel with respect to the performance of the first control, taking into account the rise time of the laser exposure unit. In other words, in the second control, the rise time necessary for preparation of the expression of the second pixel is started earlier, and the rise time itself can be shortened. As a result, it is possible to speed up image formation while maintaining reproducibility.

First, the above-mentioned rise time of the laser exposure unit indicates the time during which the laser exposure unit is in the nonlinear light emission region state, not in the laser emission region state when the unit is shifted from the nonlinear light emission region state to the laser emission region state. As a result, an initial part or the whole of the rise time passing in the nonlinear light emission region state elapses simultaneously with the scanning time for the first pixel when scanning exposure is performed in the nonlinear light emission region state. In other words, although the scanning time for the first pixel and the time for preparation of the second pixel elapse separately in the conventional art, the times overlap or elapse simultaneously. As a result, it is possible to prepare to express the second pixel while expressing the first pixel so that the scanning time for the second pixel can be ensured even if the speed of image formation is increased. In addition, in the second control, the exposure light intensity of the laser exposure unit to the second pixel is at least temporarily increased with respect to the first control, so that the rise time can be shortened. This also makes it possible to sufficiently ensure the exposure time of the second pixel.

Next, if scanning exposure is performed on the second pixel in the laser emission region state after scanning exposure is performed on the first pixel in the nonlinear light emission region state, the control unit performs the second control to advance the scan-start timing of the second pixel.

As a result, the rise time finishes earlier. In addition, in the second control, the exposure light intensity of the laser exposure unit to the second pixel is at least temporarily increased with respect to the first control, so that the rise time can be shortened, as described above. As a result, the scanning time necessary to express the second pixel can also be shortened. Accordingly, the exposure time to express the second pixel can be sufficiently ensured, so that good reproducibility of the second pixel can be maintained.

As mentioned above, since good reproducibility of the second pixel is maintained while ensuring the scanning time for the second pixel even if the speed of image formation is increased, it is possible to maintain good image reproducibility even if the speed of image formation is increased.

In the second control, for example, the control unit may control to increase the intensity more and more as earlier in the scanning time to express the second pixel, when the exposure light intensity of the laser exposure unit to the second pixel is temporarily increased with respect to the first pixel. In this case, the time necessary for rising of the laser can be further shortened, so that the speed of image formation can be increased.

According to a tenth aspect of the present invention, in the image formation apparatus according to the ninth aspect of the present invention, the laser exposure unit includes at least a RED laser exposure unit, a GREEN laser exposure unit, and a BLUE laser exposure unit. In a case of performing scanning exposure by at least one of the exposure units in the laser emission region state, and shifting other exposure unit from the nonlinear light emission region state to the laser emission region state that performs scanning exposure, the control unit performs the first control to control the scan-start timings of each of the first pixel and the second pixel by the other exposure unit in accordance with the reference clock, and to control exposure light intensity of the other laser exposure unit in accordance with first pixel data and second pixel data when the other exposure unit performs scanning exposure on the first pixel and the second pixel in the laser emission region state, and performs the second control to advance the scan-start timing of the second pixel and to at least temporarily increase the light exposure intensity of the other laser exposure unit on the second pixel with respect to the first control if the other exposure unit performs scanning exposure on the first pixel in the nonlinear light emission region state and performs scanning exposure on the second pixel having a density equal to or lower than the predetermined density in the laser emission region state. Accordingly, the exposure to the second pixel can be more sufficiently ensured so that better reproducibility of the second pixel can be maintained.

In this apparatus, at least three exposure units, the RED laser exposure unit, the GREEN laser exposure unit and the BLUE laser exposure unit, are provided. Even when any of the exposure units performs scanning exposure in the laser emission region state, and the other exposure unit performs scanning exposure in the nonlinear light emission region state to the first pixel and performs scanning exposure in the laser emission region state to the second pixel having a density equal to or lower than the predetermined density, the other exposure unit starts the rise time necessary for preparation of the second pixel earlier and the other exposure unit increases the exposure intensity of the laser exposure unit to the second pixel with respect to the first control. As a result, the exposure to the second pixel is sufficiently ensured, so that good reproducibility of the second pixel is maintained.

As mentioned above, when any of the exposure units performs scanning exposure in the laser emission region state, even if the speed of image formation is increased, it is possible to maintain better image reproducibility in the other exposure unit.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
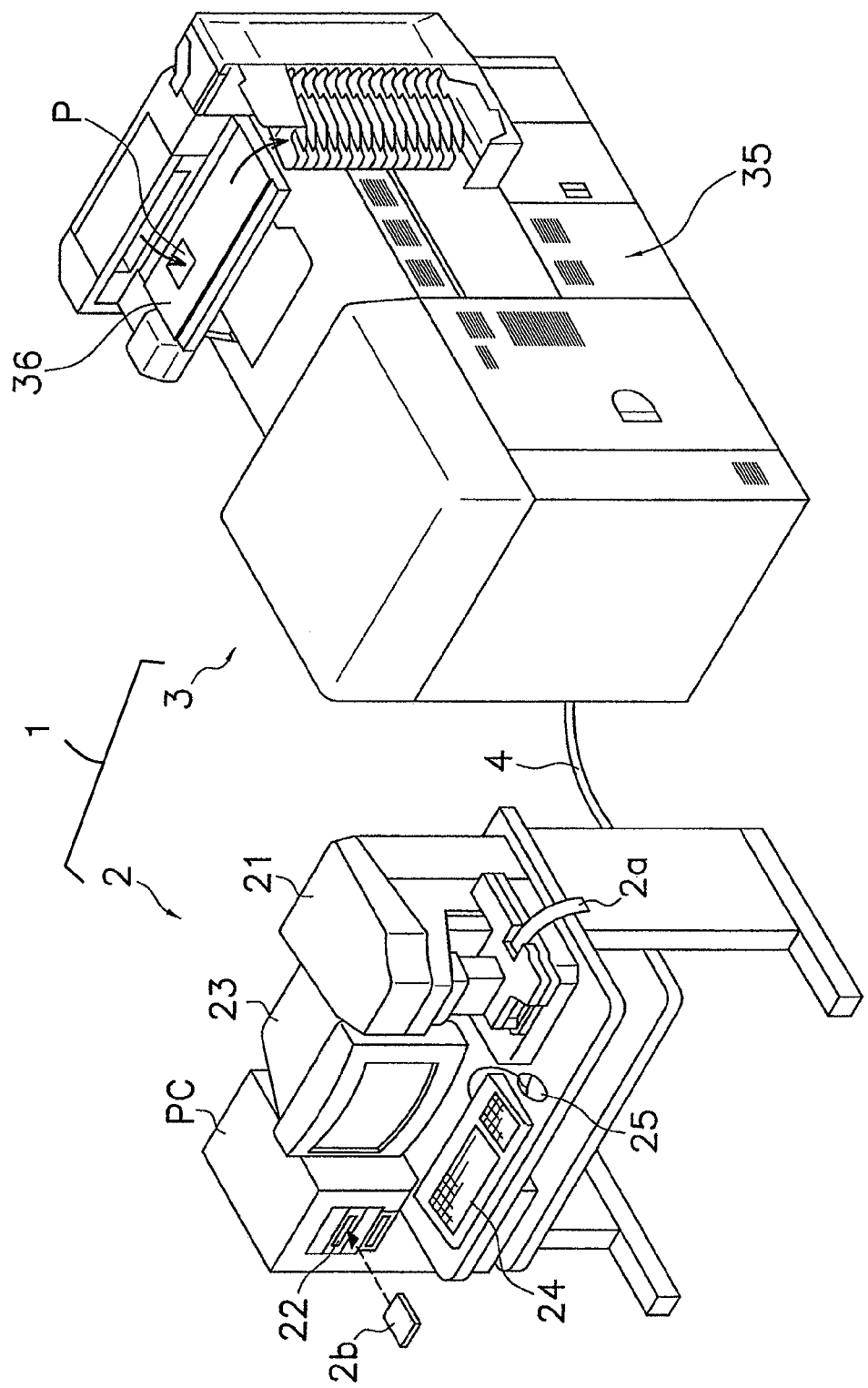
FIG. 1 is an external view of a photo-printing system according to a first embodiment according to the present invention.

Schematic structure of a photo-printing system 1 according to the first embodiment A photographic processing device according to the first embodiment of the present invention is, as shown in FIG. 1, a photo-printing system 1 which is what is called a digital minilab. The photo-printing system 1 performs processes of printing, development and drying to photosensitive material in accordance with image data of an original image to print the original image onto the photosensitive material.

The photo-printing system 1 is mainly composed of an operation station 2 and a print station 3.

The operation station 2 takes in a developed photographic film 2a or digital image data photographed by such as a digital camera from media such as a memory card 2b to form print data, and sends the formed print data to the print station 3 to be connected via a cable 4.

The print station 3 includes a laser exposure unit 34 (refer to FIG. 4), which performs an exposure process and a development process to a photographic paper P in accordance with D/A output sent from the operation station 2.

Characteristics of the Laser Exposure Unit 34

Figure 3:
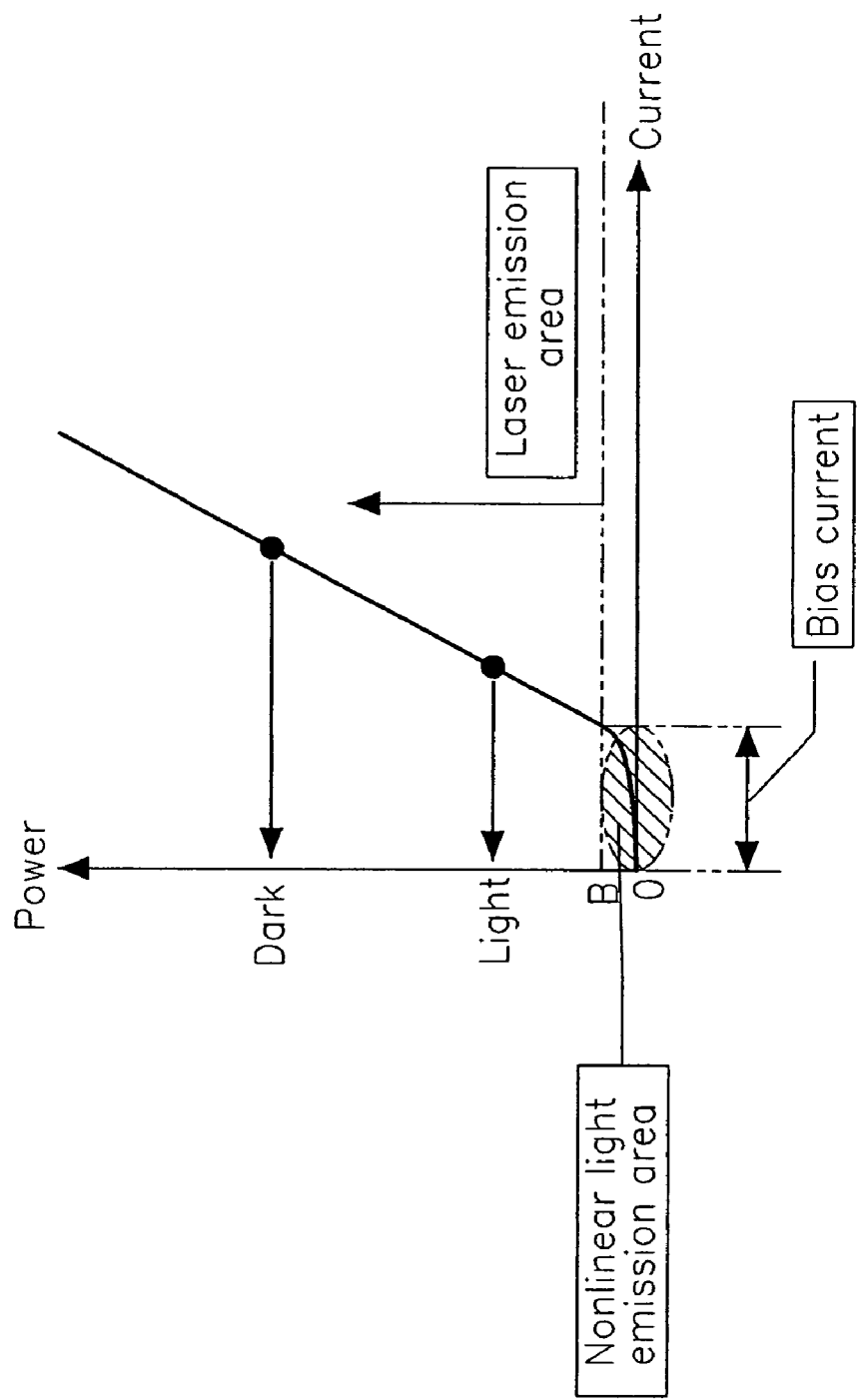
FIG. 3 is a view of a characteristic of a laser exposure unit in the first embodiment.

The laser exposure unit 34 in the print station 3 has characteristics of, as shown in FIG. 3, shifting from a nonlinear light emission region state to a laser emission region state according to applied voltage and current.

In the nonlinear light emission region state, the laser exposure unit 34 emits light but does not emit light having characteristics of laser. Accordingly, as shown in FIG. 3, by adjusting energy to be supplied so as to lower the exposure light intensity than border B, the laser exposure unit 34 is shifted into the nonlinear light emission region state in which bias current flows when expressing pixels in white color or achromatic color on a surface of the photographic paper P or standby state.

On the other hand, in the laser emission region state, the laser exposure unit 34 does not simply emit light, but can emit a light having characteristics of laser. Accordingly, the laser exposure unit 34 is shifted into the laser emission region state by adjusting the energy to be supplied so that the exposure light intensity is over border B when expressing a pixel having chromatic color on a surface of the photographic paper P, as shown in FIG. 3. In addition, in the laser emission region state, it is possible to express a pixel having higher density as the exposure light intensity rises.

The laser exposure unit 34 has characteristics of needing time required to shift from the nonlinear light emission region state to the laser emission region state by rising. For example, when the voltage applied to the laser exposure unit 34 in the nonlinear light emission region state is increased, the time required to shift would exist between a time of increasing the applied voltage and on time of shifting into the laser emission region state. In contrast, in the photo-printing system 1 according to the first embodiment, good image reproducibility data is maintained by devising how to deal with the time required to shift, even if the speed of the printing process is increased.

Hereinafter, a detailed description will be made on the operation station 2 and the print station 3.

Configuration of the Operation Station 2

Figure 4:
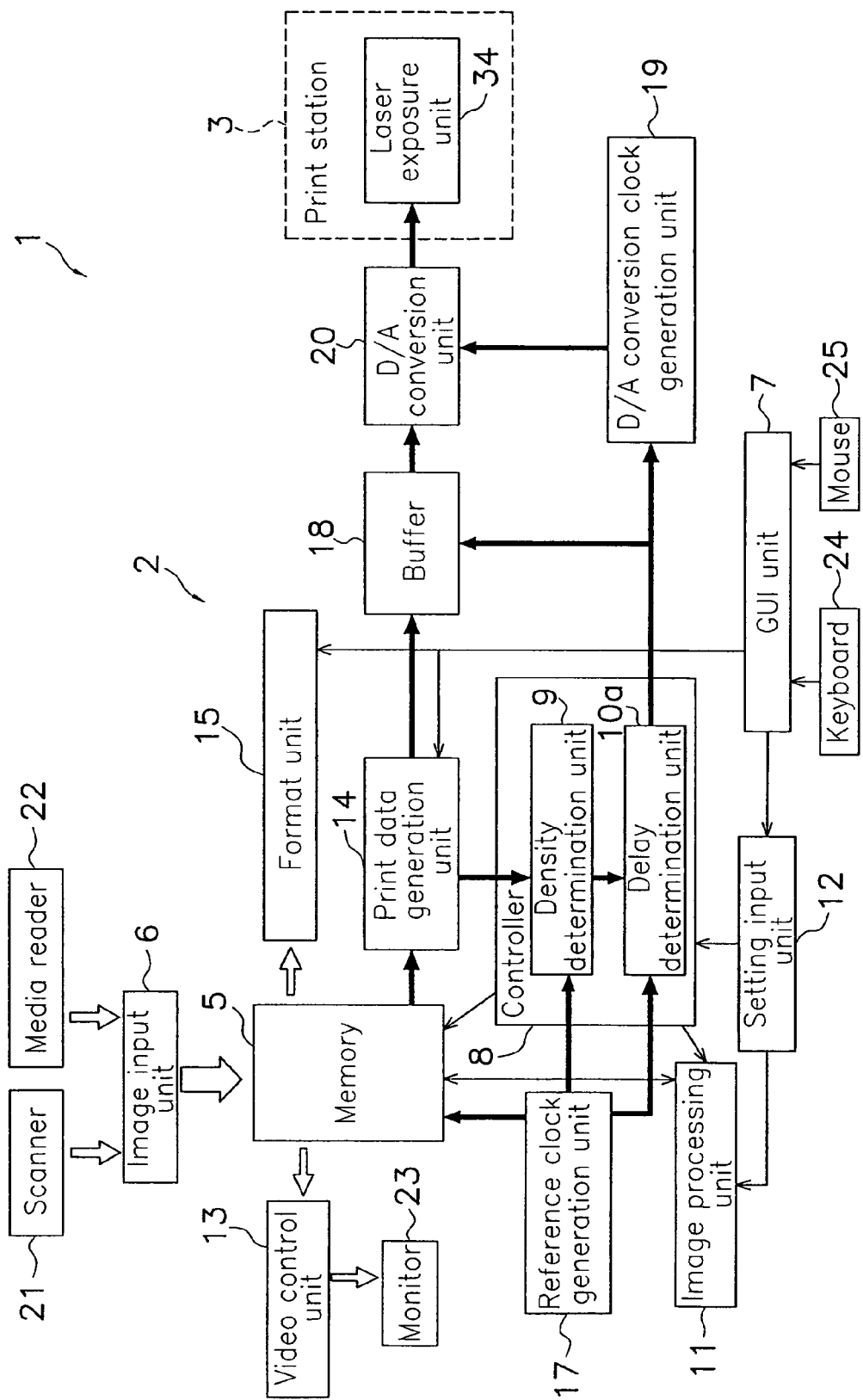
FIG. 4 is a view of a block diagram of a photo-printing system in the first embodiment.

The operation station 2 mainly forms print data which is the basis of the printing process at the print station 3, in accordance with the received digital image data. The operation station 2 includes, as shown in FIG. 1 and FIG. 4, a film scanner 21, a media reader 22, a monitor 23, a keyboard 24, a mouse 25, a personal computer (memory, a setting input unit, and a controller, for example) PC, which are set on a desk.

The film scanner 21 takes in an image corresponding to a photo frame which is developed into a photographic film 2a (the image is referred to as a photo frame image hereinafter) as digital image data.

The media reader 22 is installed in a personal computer PC which functions as a controller of the photo-printing system 1, and takes in digital image data of a photo frame image photographed by such as a digital camera from media such as a memory card 2b, various semiconductor memories and CD-Rs.

The personal computer PC is connected to the monitor 23, the keyboard 24, and the mouse 25. Moreover, the personal computer PC has embedded memory (memory) 5 such as ROM, RAM, and HDD (refer to FIG. 4). In this system, a print processing program stored in the embedded memory 5 is read by the CPU in accordance with instructions input by a user with the keyboard 24 and the mouse 25. By this operation, functions necessary to perform printing processes to the digital image data read from such as the film scanner 21 and the media reader 22 are configured as functional blocks.

Functional block configuration of the personal computer PC in the operation station 2

FIG. 4 shows a block diagram to illustrate configuration of functions of the personal computer PC in the operation station 2. The personal computer PC includes, as shown in FIG. 4, as the above-mentioned functional blocks, an image input unit 6, a GUI unit 7, an image processing unit 11, a setting input unit 12, a video control unit 13, a print data generation unit 14, a format unit 15, a controller 8, a reference clock generation unit (reference clock generation unit) 17, a buffer 18, a D/A conversion clock generation unit (delay clock generation unit) 19, a D/A conversion unit 20 and so on.

The image input unit 6 takes in image data read by the film scanner 21 or the media reader 22 as original image data by which the printing process is performed, and sends it to the embedded memory 5.

The GUI (Graphical User Interface) unit 7 configures a graphic user interface to form a graphic operation screen including various windows and various manual operation buttons, and generates control commands in accordance with input by user operation with the keyboard 24 and the mouse 25 through the graphic operation screen.

The image processing unit 11 performs an image process to the image data corresponding to each photo frame image, while reflecting corrected content such as color correction set up by the user.

The setting input unit 12 accepts setting input by the user such as print size, corrected content including color correction and input of characters.

The video control unit 13 generates video signals to display correction reproduced image depending on corrected image data, simulated images at a prejudgment operation such as print source image and anticipated finished print image, and graphic data sent from the GUI unit 7 on the monitor 23.

The print data generation unit 14 generates print data according to the final corrected image data for the laser exposure unit 34 in the print station 3. The print data generation unit 14 sends the print data to the laser exposure unit 34 in the print station 3 and a density determination unit (decision unit) 9, later described, of the controller 8.

The format unit 15 formats raw photo image data or corrected photo image data which has been corrected, in response to requests by the client, to write in CD-R and send it to the CD-R drive.

The reference clock generation unit 17 generates reference clock at constant periods which is reference for providing enough exposure to each pixel when the image data is reproduced at constant periods. The reference clock generation unit 17 sends the reference clock to the density determination unit 9, a delay determination unit (delay adjustment unit) 10a, later described, of the controller 8 and the embedded memory 5 and so on so that the reference clock is treated as reference for controlling the operational abilities of the each unit.

The D/A conversion clock generation unit 19, in principle, generates D/A conversion clock having a generation timing delayed from the generation timing of the reference clock in the reference clock generation unit 17 by a predetermined time. The D/A conversion clock is treated as reference for controlling the scan-start timing of the laser exposure unit 34. Alternatively, the D/A conversion clock generation unit 19, as an exceptional case to be described later, generates D/A conversion clock whose degree of delay from the generation timing of the reference clock in the laser exposure unit 34 is adjusted to reflect the time required to shift.

The controller 8 knows density of each pixel composing the image data in accordance with print data gained from the print data generation unit 14, and performs control in response to the content of the image data in order to optimize the scan-start timing based on the image data in the printing process. The controller 8 controls setting such as print size, corrected content, and character writing to one photo frame image. More specifically, the controller 8 has the density determination unit 9 and the delay determination unit 10a to perform the above-described processes. The controller 8 performs a determination process for each pixel. Hereinafter, a pixel to be scanned for exposure earlier is referred to as a first pixel, and a pixel to be scanned for exposure after the first pixel is referred to as a second pixel.

The density determination unit 9 receives the print data from the print data generation unit 14. Then, the density determination unit 9 receives the reference clock from the reference clock generation unit 17 to know the process timing, and determines density data on each pixel. The density determination unit 9 in the photo-printing system 1 according to the third embodiment determines the density difference or density ratio between the pixels to decide the sequence of the pixels to perform the printing process.

The delay determination unit 10*a* receives the density determination result from the density determination unit 9. Then, the delay determination unit 10*a* receives the reference clock from the reference clock generation unit 17 to know the process timing, and selects degree of delay in each pixel referring to the preinstalled table. When the delay determination unit 10*a* adjusts the generation timing of the D/A conversion clock for the object pixel in the D/A conversion clock generation unit 19 in response to the selected degree of delay, the D/A conversion clock generation unit 19 generates the D/A conversion clock. In addition, the delay determination unit 10*a* fine tunes the generation timing of the D/A conversion clock in response to determination results of the density difference or density ratio by the density determination unit 9.

Figure 5:
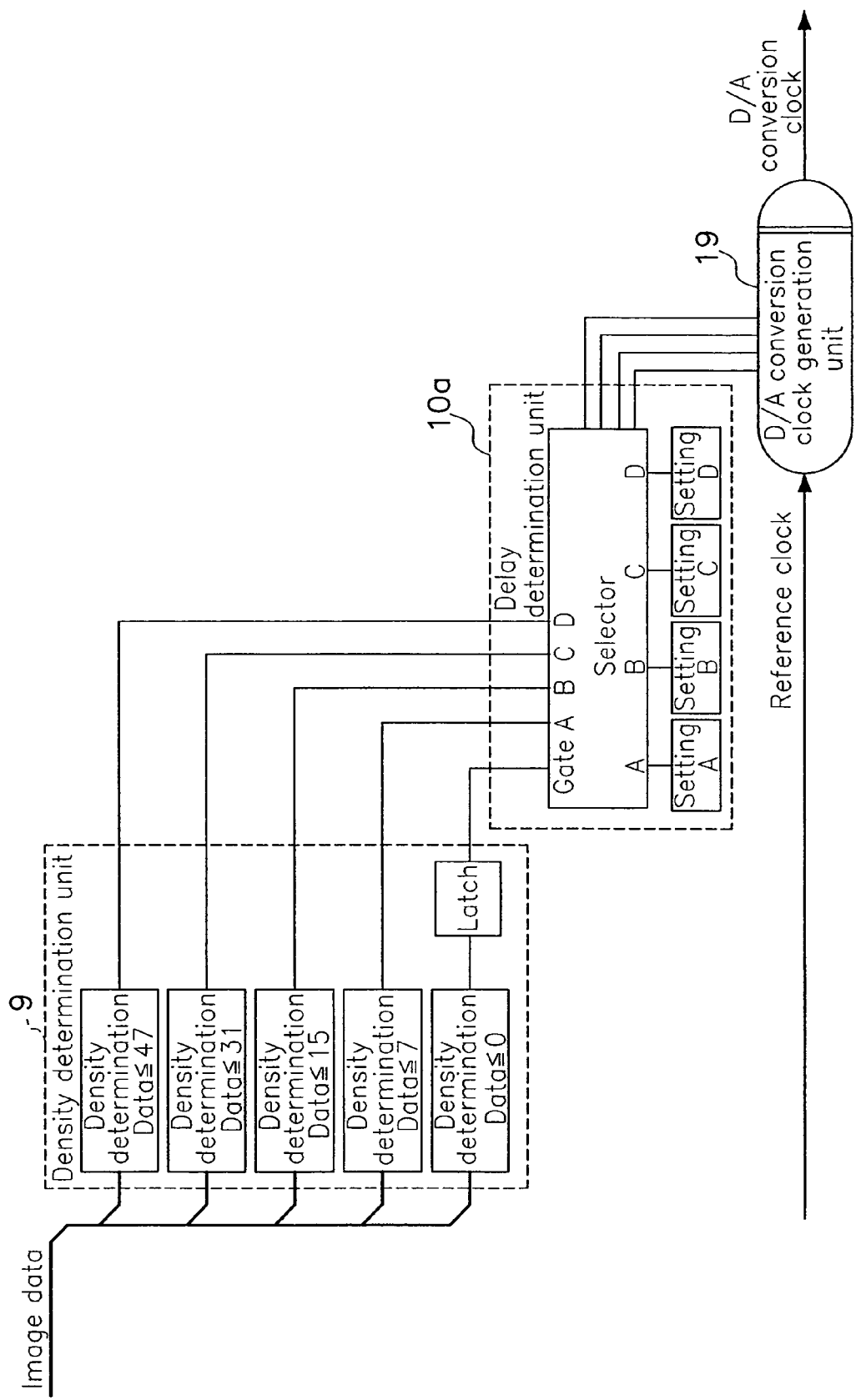
FIG. 5 is a detailed block diagram of a D/A conversion clock generation unit.

More specifically, as shown in FIG. 5, the density determination unit 9 has five stages of the density tables to be selected according to the pixel density. When the laser exposure unit 34 scans the first pixel for exposure in the nonlinear light emission region state, then scans the second pixel for exposure in the laser emission region state with laser exposure light intensity equal to or lower than half of the maximum exposure light intensity of the laser exposure unit 34 (scanning the second pixel having a density equal to or lower than the predetermined density), the exceptional control is performed on the basis of the characteristics of the laser exposure unit 34. In other words, the control is performed to generate the D/A conversion clock at the timing at which the degree of delay from the reference clock is decreased. Furthermore, because pixels in white or achromatic color has "0" density, the latch maintains the signal having "0" value as it is inputted. Then, according to selected stage, the delay determination unit 10*a* selects one from settings A to D for the pixels selected according to the densities. Because each delay table is provided at the laser exposure unit 34 for each exposure light intensity of the pixels having densities equal to or lower than the predetermined density, the settings A to D are set up according to a delay table at the delay determination unit 10*a*. The D/A conversion clock generation unit 19, according to one selected from the settings A to D selected at the delay determination unit 10*a*, adjusts degree of delay from the reference clock to generate the D/A conversion clock corresponding to each pixel. Accordingly, if it is eventually determined that the first pixel and the second pixel have a density for scanning exposure in the laser emission region state, the controller 8, as a general principle process, performs the process at the delayed D/A conversion clock. Alternatively, if it is determined that the first pixel has a density for scanning exposure in the nonlinear light emission region state and the second pixel has a density for scanning exposure in the laser emission region state so that it needs time required to shift, the controller 8 performs the process at the D/A conversion clock whose degree of delay is decreased, as an exceptional process.

As described above, the D/A conversion clock generation unit 19 generates different D/A conversion clocks for each pixel while accepting the image data, and assigns the scanning times to each of the pixel to be reflected in the D/A output. Since the controller 8 adjusts the degree of delay of the D/A conversion clock, the scanning time for the pixels are adjusted. As a result, reproducibility of each of the pixel is improved when accepting the image data and forming the D/A output simultaneously.

The buffer 18 temporarily stores the print data from the print data generation unit 14 so that overflow of the print data at the D/A conversion unit 20 is prevented and ensured time required to perform a forming process of the D/A output. Accordingly, it is possible to achieve a flexible correspondence between the delay timings for each pixel adjusted at the delay determination unit 10*a* and the print data to be scanned for exposure at the timings.

As receiving the print data from the buffer 18 while receiving the D/A conversion clock from the D/A conversion clock generation unit 19, the D/A conversion unit 20 generates D/A output to allow the laser exposure unit 34 to perform scanning exposure at the scan-start timing in which the time required to shift of the laser exposure unit 34 (refer to FIG. 6) is reflected. The D/A output, which can deal with a high-speed process as well as maintaining good reproducibility, is sent to the laser exposure unit 34 in the print station 3 to perform the printing process.

Configuration of the Print Station 3

Figure 2:
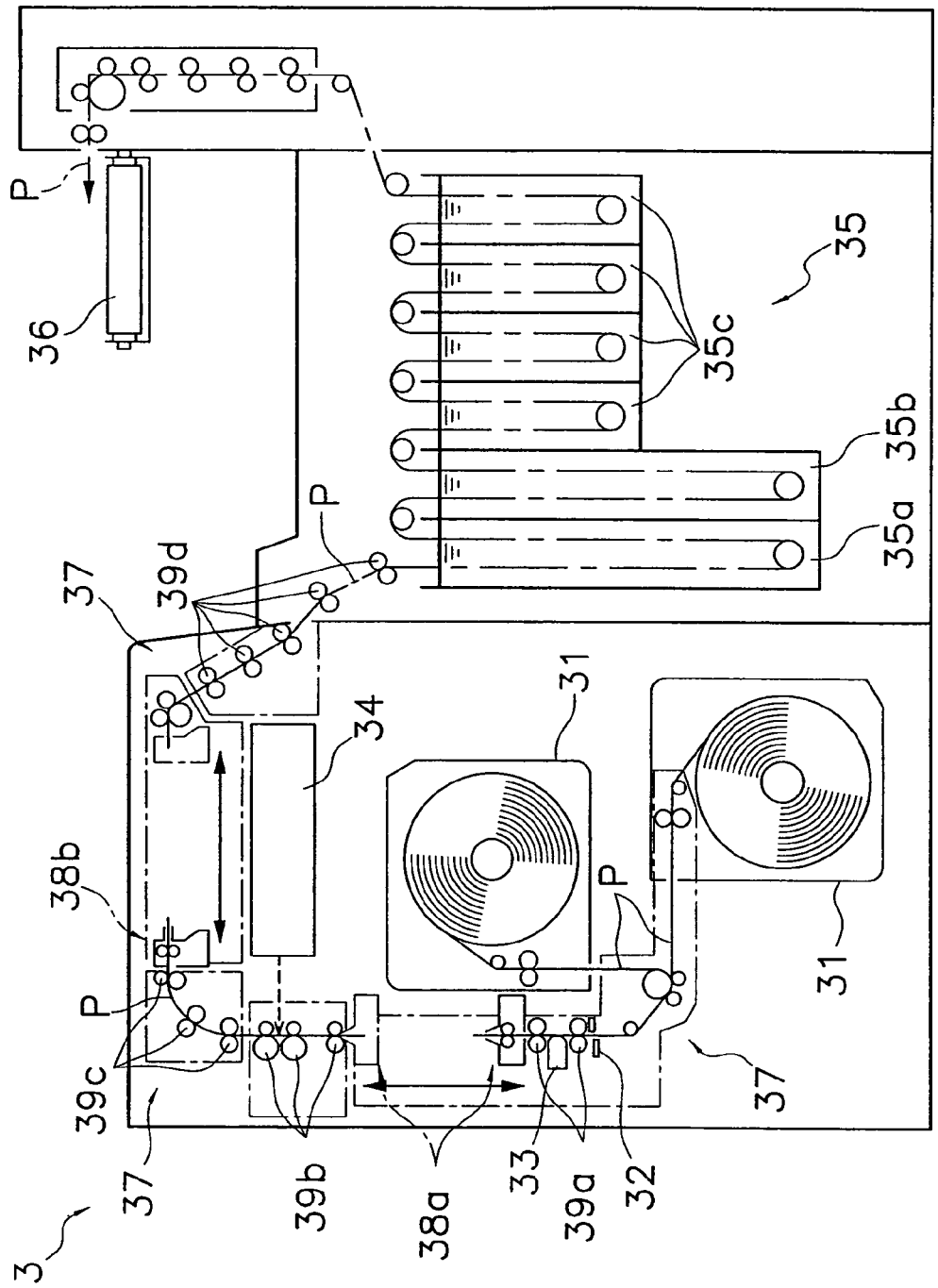
FIG. 2 is a view of a schematic diagram showing configuration of a print station in the first embodiment.

The print station 3 mainly performs the printing process in accordance with the D/A output depending on the D/A conversion clock sent from the operation station 2. The print station 3 internally includes, as shown in FIG. 2, two photographic paper magazines 31, a sheet cutter 32, a back print unit 33, the laser exposure unit 34, a processing tank unit 35, a conveyor 36, and a photographic paper conveyance mechanism 37.

The two photographic paper magazines 31 contain roll photographic papers P within the print station 3, which is taken out by the photographic paper conveyance mechanism 37 by an appropriate amount.

The sheet cutter 32 is disposed so as to be adjacent with a part of the photographic paper conveyance mechanism 37, and cuts the photographic paper P drawn out from the photographic paper magazine 31 into a print size.

The back print unit 33 is disposed downstream of the sheet cutter 32 in a conveyance direction so as to be adjacent with the photographic paper conveyance mechanism 37, and prints print data such as color correction data and frame number on a back surface of the photographic paper P cut into the print size.

The laser exposure unit 34 is disposed downstream of the back print unit 33 in the conveyance direction and adjacent with the photographic paper conveyance mechanism 37. The laser exposure unit 34 scans the surface of the photographic paper P for exposure in accordance with the D/A output at the timing of the D/A conversion clock when the voltage and current are applied from outside. The laser exposure unit 34 includes a line exposure head (not illustrated) to irradiate the surface of the photographic paper P with the laser beam in three colors of RGB. The line exposure head scans for exposure along a main scanning direction crossing a direction in which the photographic paper P is conveyed (sub-scanning direction).

The processing tank unit 35 is disposed downstream of the laser exposure unit 34 in the conveyance direction, and includes a chromogenic development tank 35*a* for reserving chromogenic development processing liquid, a bleach/fix tank 35*b* for reserving bleaching/fixing process liquid, stabilization process tanks 35*c* for reserving stabilization process liquid. The photographic paper conveyance mechanism 37 conveys the exposed photographic paper P through these processing tanks 35a to 35c in this order to form a desired photography print image on the surface of the photographic paper P.

The conveyor 36 is exposed at the upper portion of the print station 3, and conveys the photographic paper P to a sorter not shown, after the printing process and the drying process. The sorter is composed of a plurality of trays arranged in the vertical direction on the front of the print station 3, and sorts printed photographic papers P conveyed by the conveyor 36 into each of the trays in a unit of the order.

The photographic paper conveyance mechanism 37 draws out the roll photographic papers P contained in the photographic paper magazines 31, and conveys the photographic paper P cut into the print size at conveyance speeds corresponding to various printing processes. In addition, the photographic paper conveyance mechanism 37 has a chucker conveyance unit 38 (38a and 38b) and a plurality of pairs of pinching conveyance rollers 39 (39a to 39d). The chucker conveyance unit 38 is disposed upstream of the laser exposure unit 34 in the conveyance direction of the photographic paper P. The pairs of pinching conveyance rollers 39 are disposed downstream of the laser exposure unit 34 in the conveyance direction of the photographic paper P. The chucker conveyance unit 38 and the pairs of pinching conveyance rollers 39 make it possible to convey the photographic paper P without bending.

Sequence of the Printing Process

Figure 6:
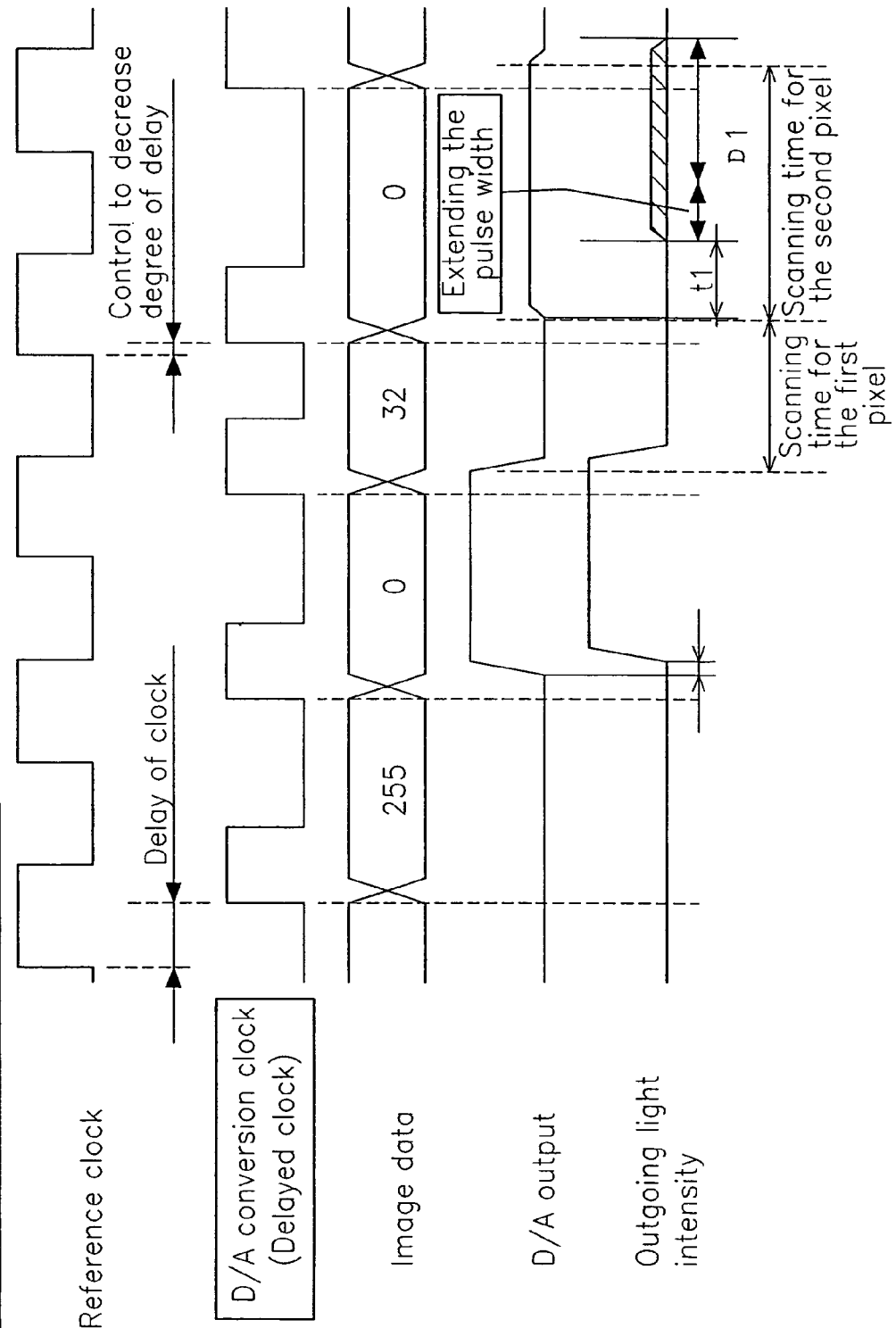
FIG. 6 is a sequence diagram showing a printing process in the first embodiment.
Figure 10:
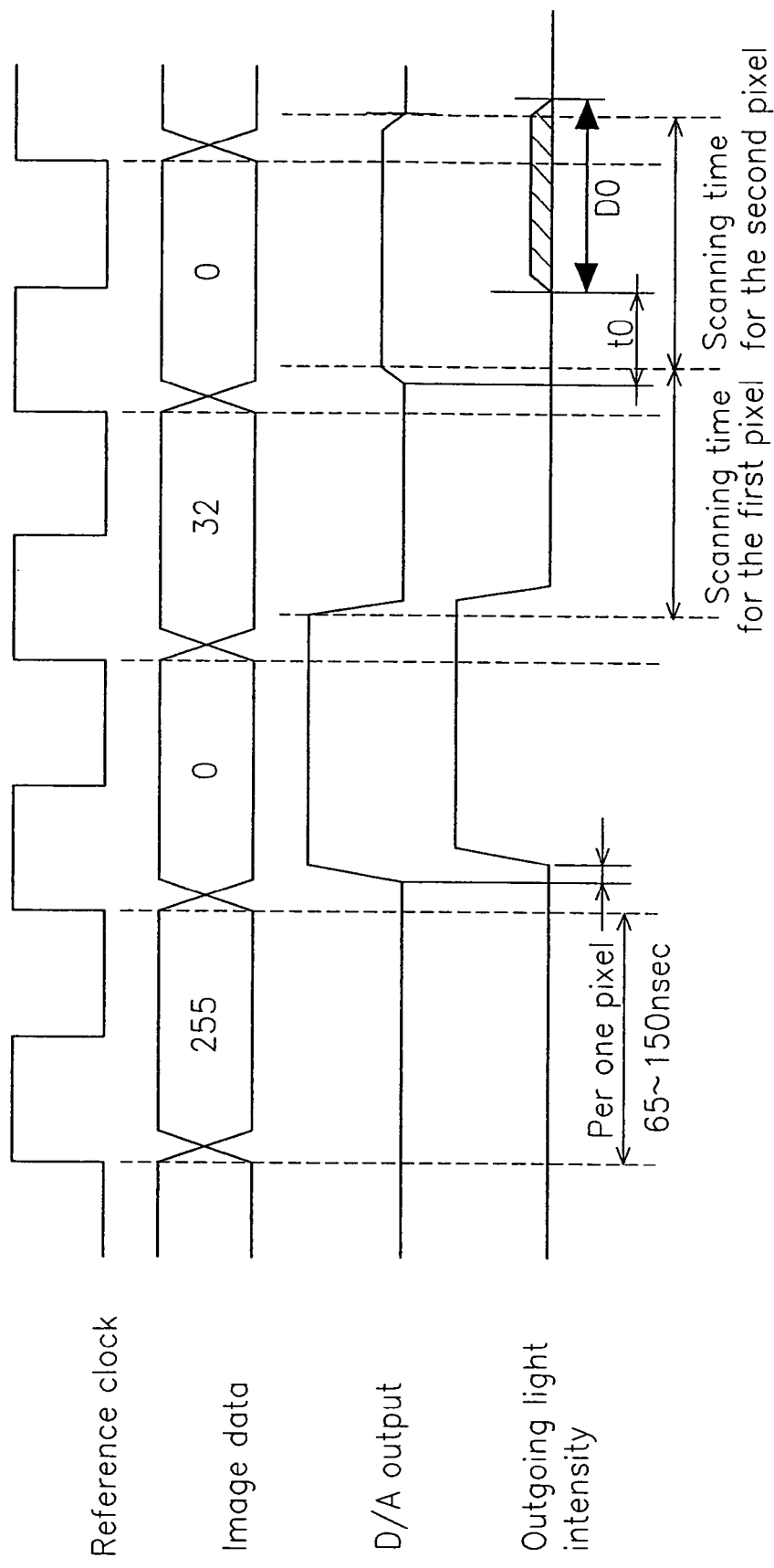
FIG. 10 is a sequence diagram showing a conventional process of forming print data.

FIG. 6 and FIG. 10 show sequence diagrams of the printing process. It should be noted that FIG. 10 shows the sequence diagram of the conventional printing process, and shows the sequence of the printing process in which the scanning time assigned to one pixel is sufficiently long. FIG. 6 shows the sequence diagram of the printing process according to the first embodiment. According to FIG. 6 concerning the photo-printing system 1 in the first embodiment, the scanning time assigned to one pixel is shorter and the printing process is performed faster with respect to the conventional one shown in FIG. 10.

In FIG. 6 and FIG. 10, the reference clock indicates clock with constant periods generated by the above-mentioned reference clock generation unit 17. The D/A conversion clock indicates clock in which the degree of delay from the reference clock, generated by the D/A conversion clock generation unit 19, is reflected in accordance with the pixel density. The image data is expressed as the density of each pixel. The density of the pixels is expressed as corresponding to the generation timing of the D/A conversion clock. The D/A output corresponds to the output finally gained at the D/A conversion unit 20, and is expressed as data on time variation of the energy applied to the laser exposure unit 34 after receiving the D/A conversion clock and the image data. The outgoing light intensity is expressed as data on time variation of the exposure light intensity (intensity of light having characteristics of laser) of the laser actually emitted corresponding to time variation of the energy applied to the laser exposure unit 34 in accordance with the D/A output.

As shown in FIG. 6, at the printing process, like the conventional printing process shown in FIG. 10, voltage is applied to the laser exposure unit 34 in accordance with the pixel density.

In the conventional printing process, as shown in FIG. 10, the printing process is performed on each pixel at a frequency having a constant time interval (65 to 150 nsec), without depending on pixel density. In the process, if a pixel having the density "0" (a first pixel to be scanned for exposure in the nonlinear light emission region state) is expressed and then a pixel having a density equal to or lower than the predetermined density "32" (a second pixel to be scanned for exposure in the laser emission region state) is expressed, it needs time required to shift "t0" as described above. In the conventional printing process in which the scanning time for the first pixel is equal to the scanning time for the second pixel, for the pixel to be scanned for exposure in the laser emission region state after the pixel to be scanned for exposure in the nonlinear light emission region state, exposure time (pulse width) in the laser emission region state is ensured only for the exposure time "D0". As a result, it can not ensure a sufficient exposure of laser (refer to a pulse shown in hatch lines of the outgoing light intensity shown in FIG. 10), so that reproducibility can not be maintained.

In contrast, in the photo-printing system 1 according to the first embodiment, as shown in FIG. 6, the laser exposure unit 34 performs the printing process on each pixel at time intervals depending on the pixel density to be expressed. In this system, if the pixel having a density "0" (a first pixel to be scanned for exposure in the nonlinear light emission region state) and then a pixel having a density equal to or lower than the predetermined density "32" (a second pixel to be scanned for exposure in the laser emission region state) is expressed, the D/A conversion unit 19 generates the D/A output in accordance with the D/A conversion clock, whose degree of delay from the reference clock is adjusted for each pixel density by the delay determination unit 10a of the controller 8. In this case, the D/A conversion clock generated by the D/A conversion clock generation unit 19 is adjusted to be decreased by the delay determination unit 10a. Therefore, the scan-start timing of the second pixel is advanced taking into account the above-mentioned time required to shift "t1"(=t0) so that the scanning time for the second pixel can be ensured longer than before. As a result, even if it is necessary to wait for the time required to shift "t1" to elapse, when expressing the second pixel, the longer exposure time (pulse width) in the laser emission region state can be ensured by the exposure time D1 longer than the conventional exposure time D0 (refer to a pulse shown in hatch lines of the outgoing light intensity in FIG. 6). As a result, good reproducibility of the second pixel is maintained. As understood from the D/A output, the scanning time for the second pixel is started earlier so that the scanning time for the first pixel can be shorter than before. In this system, although the scanning time for the first pixel is shortened, the exposure time by light in the nonlinear light emission region state is shortened only, good reproducibility of the first pixel having a density "0" can be maintained. As a result, the total scanning time for the first pixel and the scanning time for the second pixel can be shortened to speed up the printing process.

Features of the Photo-printing System 1 According to the First Embodiment (1)

In the photo-printing system 1 according to the first embodiment, if the first pixel is scanned for exposure in the nonlinear light emission region state and the second pixel having a density equal to or lower than the predetermined density is scanned for exposure in the laser emission region state, the control is performed to advance the scan-start timing of the second pixel, taking into account the time required to shift (rise time) of the laser exposure unit 34. In other words, the time required to shift is started earlier for the preparation to express the second pixel to be started earlier.

It is noted that the above-mentioned rise time of the laser exposure unit 34 indicates the time during which the laser exposure unit 34 is in the nonlinear light emission region state when the unit is shifted from the nonlinear light emission region state to the laser emission region state.

If the scan-start timing is adjusted so as to advance as described above, an initial part or the whole of the rise time, time passing in the nonlinear light emission region state, elapses simultaneously with the scanning time for the first pixel when scanning exposure is performed in the nonlinear light emission region state. In other words, although the scanning time for the first pixel and time for preparation to express the second pixel (time required to shift) elapse separately in the conventional art, parts of the times are overlapped or elapse simultaneously. As a result, it is possible to prepare to express the second pixel while scanning the first pixel for exposure, so that the scanning time for the second pixel can be ensured even if the speed of image formation is increased.

If scanning exposure is performed on the second pixel in the laser emission region state after scanning exposure is performed on the first pixel in the nonlinear light emission region state, the control is performed to advance the scan-start timing of the second pixel. As a result, the time required to shift of the laser exposure unit 34 finishes earlier. Accordingly, the exposure time can be ensured to express the second pixel. As a result, it is possible to ensure enough exposure to the second pixel, thereby maintaining good image reproducibility.

Also, for the first pixel to be scanned for exposure in the nonlinear light emission region state, it does not necessary to prepare light having characteristics of laser because the first pixel has a low density, it is only necessary for the laser exposure unit 34 to emit light. Therefore, even if the above-mentioned process shortens the scanning time for the first pixel by advancing the start timing of the time required to shift, a reproducibility of the first pixel is unlikely to be affected.

In summary, compared to the conventional printing process with the constant period, even if the speed of image formation is increased, it is possible to maintain good image reproducibility.

(2)

In the photo-printing system 1 according to the first embodiment, the scan-start timing is adjusted according to the density difference or the density ratio between the first pixel and the second pixel. More specifically, if the density difference is small, the degree of advancement of the scan-start timing of the second pixel is increased. If the density difference is large, the degree of advancement of the scan-start timing of the second pixel is decreased.

As a result, the exposure to the second pixel is more reliably ensured, so that good reproducibility is maintained, thereby maintaining good image reproducibility even if the speed of the printing process is increased.

(3)

In the photo-printing system 1 according to the first embodiment, the D/A conversion clock generation unit 19 is provided for generating the D/A conversion clock, whose generation timing is delayed from the generation timing of the reference clock. The D/A conversion clock generation unit 19 generates the D/A conversion clock which has less degree of delay from the generation timing of the reference clock when expressing the second pixel.

Accordingly, it is possible to assign different scanning times to each pixel for the printing process while receiving the image data. As a result, when the printing process is performed while receiving the image data, a reproduction certainty of each pixel is improved.

(4)

In the photo-printing system 1 according to the first embodiment, the density determination unit 9, the delay determination unit 10a, and the buffer 18 are provided. The density determination unit 9 determines the density difference between the first pixel and the second pixel. The delay determination unit 10a instructs the D/A conversion clock generation unit 19 to adjust delay degree of the D/A conversion clock in accordance with the outcome of decision by the density determination unit 9. The buffer 18 temporarily stores first pixel data and the second pixel data.

In summary, since the buffer 18 temporarily stores the image data to ensure time, it is possible to ensure process times at the density determination unit 9 or the delay determination unit 10a.

Accordingly, the D/A output is generated in which the generation timing of the D/A conversion clock whose degree of delay is adjusted according to density correspond to the output timing of the image data which is expressed according to the timing of the D/A conversion clock. The laser exposure unit 34 performs the printing process in accordance with the D/A output in which the timing of the D/A conversion clock corresponds to the timing of the image data. As a result, it is possible to scan for exposure at the desired timing, thereby maintaining good image reproducibility.

Schematic configuration of the photo-printing system 50 according to the second embodiment The first embodiment according to the present invention is described above, but it will be understood that the present invention is not limited to the embodiment disclosed, but is capable of numerous rearrangements, modifications and substitutions without departing from the spirit of the invention as the second embodiment shown below.

The photo-printing system 50 according to the second embodiment is different from the photo-printing system 1 according to the first embodiment in the following points. In particular, the photo-printing system 50 of the second embodiment includes an operation station 2' and the print station 3 of the first embodiment. The operation station 2' of the second embodiment is a slightly modified version of the operation station 2 of the first embodiment.

In the above-mentioned photo-printing system 1 according to the first embodiment, the scan-start timing of the second pixel is adjusted to perform the printing process, wherein the second pixel having a density equal to or lower than the predetermined density is scanned for exposure in the laser emission region state after the first pixel is scanned for exposure in the nonlinear light emission region state.

In contrast, in the operation station 2' photo-printing system 50 according to the second embodiment, the laser exposure light intensity on the second pixel is adjusted to perform the printing process, wherein the second pixel having a density equal to or lower than the predetermined density is scanned for exposure in the laser emission region state after the first pixel is scanned for exposure in the nonlinear light emission region state.

Figure 7:
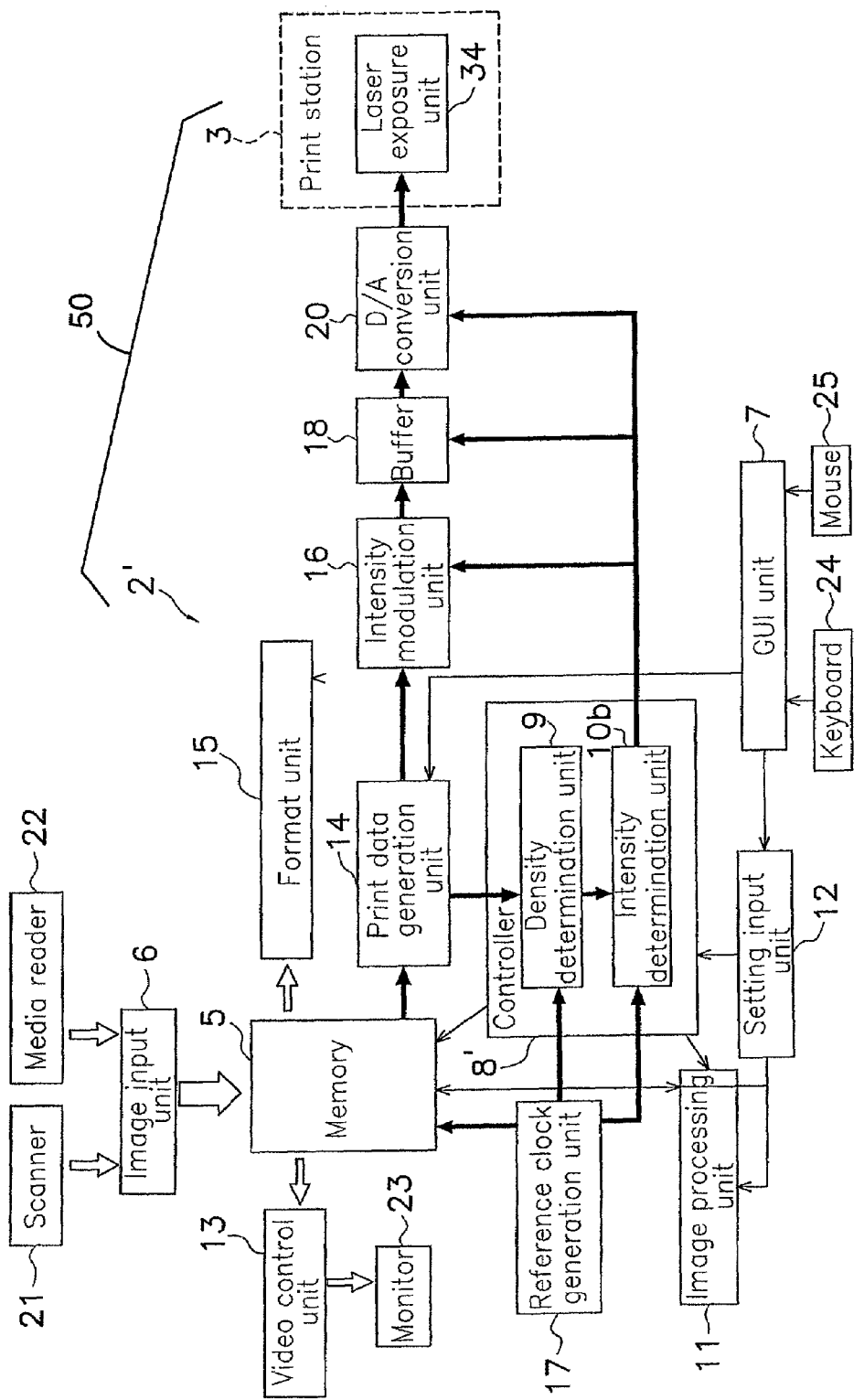
FIG. 7 is a view of block diagram of a photo-printing system in a second embodiment.

Specifically, as shown in FIG. 7, in the photo-printing system 50 according to the second embodiment, the operation station 2' includes an intensity determination unit 10b is provided in place of the delay determination unit 10a of the controller 8 in the first embodiment to form a modified controller 8' of the second embodiment. In the operation station 2' of the photo-printing system 50 according to the second embodiment, an intensity modulation unit 16 is further provided for receiving the outcome of the determination from the intensity determination unit 10b. The intensity modulation unit 16 performs laser intensity modulation in accordance with the intensity determined by the intensity determination unit 10b to express the print data.

Figure 8:
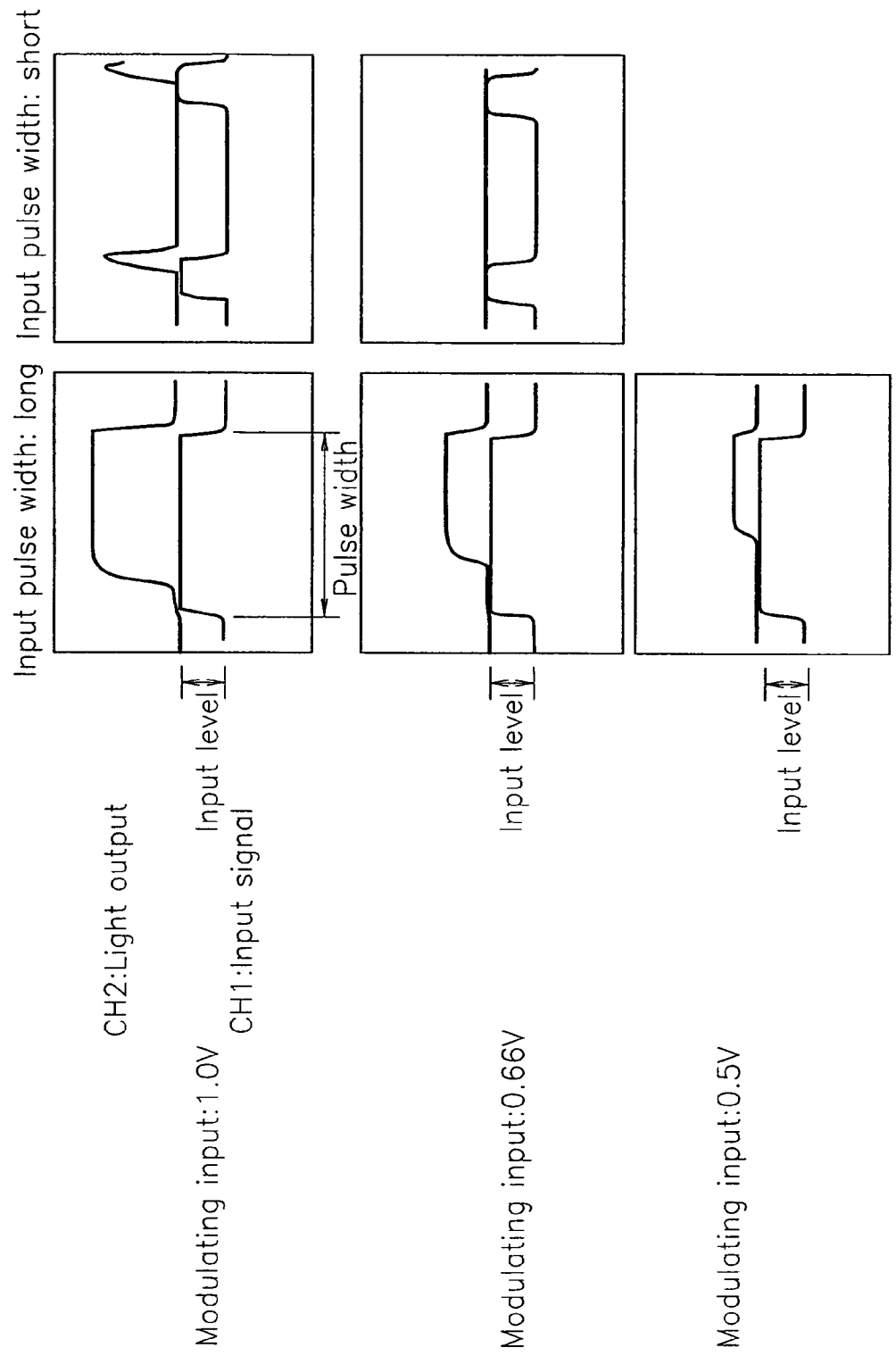
FIG. 8 is a view of explaining about modulation of the laser intensity in the photo-printing system in the second embodiment.

Generally, as characteristics of laser, as shown in FIG. 8, even if the time intervals (pulse widths) of the input signals are the same, as the exposure light intensity is stronger, the time required to shift becomes shorter, and as the exposure light intensity is weaker, the time required to shift becomes longer. As a result, if the exposure light intensity of laser is weak, and especially the time interval (pulse width) of the input signal is short, next pixel may be scanned before the time required to shift has elapsed. In this situation, scanning exposure is not sufficiently performed in the laser emission region state. In the second embodiment, the printing process is performed so as to counter this problem.

The controller 8' includes the density determination unit 9 and the intensity determination unit 10b to perform the above-mentioned process.

The intensity determination unit 10b receives outcome of density determination from the density determination unit 9, knows the process timing by receiving the reference clock from the reference clock generation unit 17, and selects exposure light intensity for each pixel referring to the preinstalled table. The intensity determination unit 10b instructs the intensity modulation unit 16 to modulate data portion related to intensity in order to make value of data related to intensity in print data correspond to the selected exposure light intensity. The intensity determination unit 10b also fine-tunes the intensity modulation of the print data in accordance with determination outcome about the density difference or density ratio from the density determination unit 9. The pulse signals of the D/A output to express the second pixel may have a first half with stronger intensity when the second pixel which is scanned for exposure in the laser emission region state after the first pixel scanned for exposure in the nonlinear light emission region state is expressed. As a result, the time required to shift can be shortened (refer to FIG. 7).

Accordingly, if the controller 8' eventually determines that the first pixel and the second pixel have density to be scanned for exposure in the laser emission region state, scanning exposure is performed with intensity of the print data whose intensity is not modulated, as a general principle process. Alternatively, if the controller 8' determines that the first pixel is scanned for exposure in the nonlinear light emission region state and the second pixel is scanned for exposure in the laser emission region state so that it is necessary to have time required to shift because the second pixel has density equal to or lower than the predetermined density, scanning exposure is performed with intensity of the print data having adjusted exposure light intensity, as an exceptional process.

Other structures are the same with those in the above-mentioned first embodiment.

Features of the Photo-printing System 50 According to the Second Embodiment (1)

In the photo-printing system 50 according to the second embodiment, when the first pixel is scanned for exposure in the nonlinear light emission region state and the second pixel having a density equal to or lower than the predetermined density is scanned for exposure in the laser emission region state, the controller 8' controls the laser exposure unit 34 to increase the exposure light intensity on the second pixel, taking into account the time required to shift of the laser exposure unit 34.

As described above, since the time required to shift can be shortened, it is possible to shorten the scanning time necessary to express the second pixel. As a result, the speed of the printing process is increased.

In addition, since the exposure light intensity is increased so that the time required to shift of the laser exposure unit 34 is shortened, the exposure to express the second pixel is sufficiently ensured and the effects of the time required to shift is reduced. As a result, good image reproducibility data can be maintained.

In summary, compared to the conventional printing process at constant periods, the speed of the printing process is increased while maintaining good image reproducibility.

(2)

In the photo-printing system 50 according to the second embodiment, the exposure light intensity of the laser exposure unit 34 is adjusted in accordance with the density difference or the density ratio between the first pixel and second pixel. More specifically, as the density difference is smaller, the exposure light intensity is increased, and if the density difference is larger, the exposure light intensity is decreased.

As a result, scanning time for the second pixel is further shortened. Accordingly, good image reproducibility can be maintained even if the speed of the printing process is increased.

Schematic configuration of the photo-printing system 60 according to the third embodiment The first and the second embodiments according to the present invention are described above, but it will be understood that the present invention is not limited to the embodiments disclosed, but is capable of numerous rearrangements, modifications and substitutions without departing from the spirit of the invention as the third embodiment to be shown below.

The photo-printing system 60 according to the third embodiment is different from the photo-printing systems 1 and 50 of the first and second embodiments in the following points. In particular, the photo-printing system 60 of the third embodiment includes an operation station 2" and the print station 3 of the first embodiment. The operation station 2" of the third embodiment is a slightly modified version of the operation stations 2 and 2' of the first and second embodiments.

In the photo-printing system 1 according to the first embodiment, the scan-start timing of the second pixel is adjusted when the printing process is performed. In addition, in the photo-printing system 50 according to the second embodiment, the laser exposure light intensity on the second pixel is adjusted to shorten the scanning time when the printing process is performed.

In contrast, in the operation station 2" of the photo-printing system 60 according to the third embodiment, when the first pixel is scanned for exposure in the nonlinear light emission region state and then the second pixel having a density equal to or lower than the predetermined density is scanned for exposure in the laser emission region state, adjustments to the scan-start timing of the second pixel and the laser exposure light intensity on the second pixel are made to perform the printing process. Furthermore, in the photo-printing system 60 according to the third embodiment, the scan-start timing and the exposure light intensity of the laser are adjusted in accordance with the density difference or density ratio between the first pixel and the second pixel, so that the speed of the process is further increased.

Figure 9:
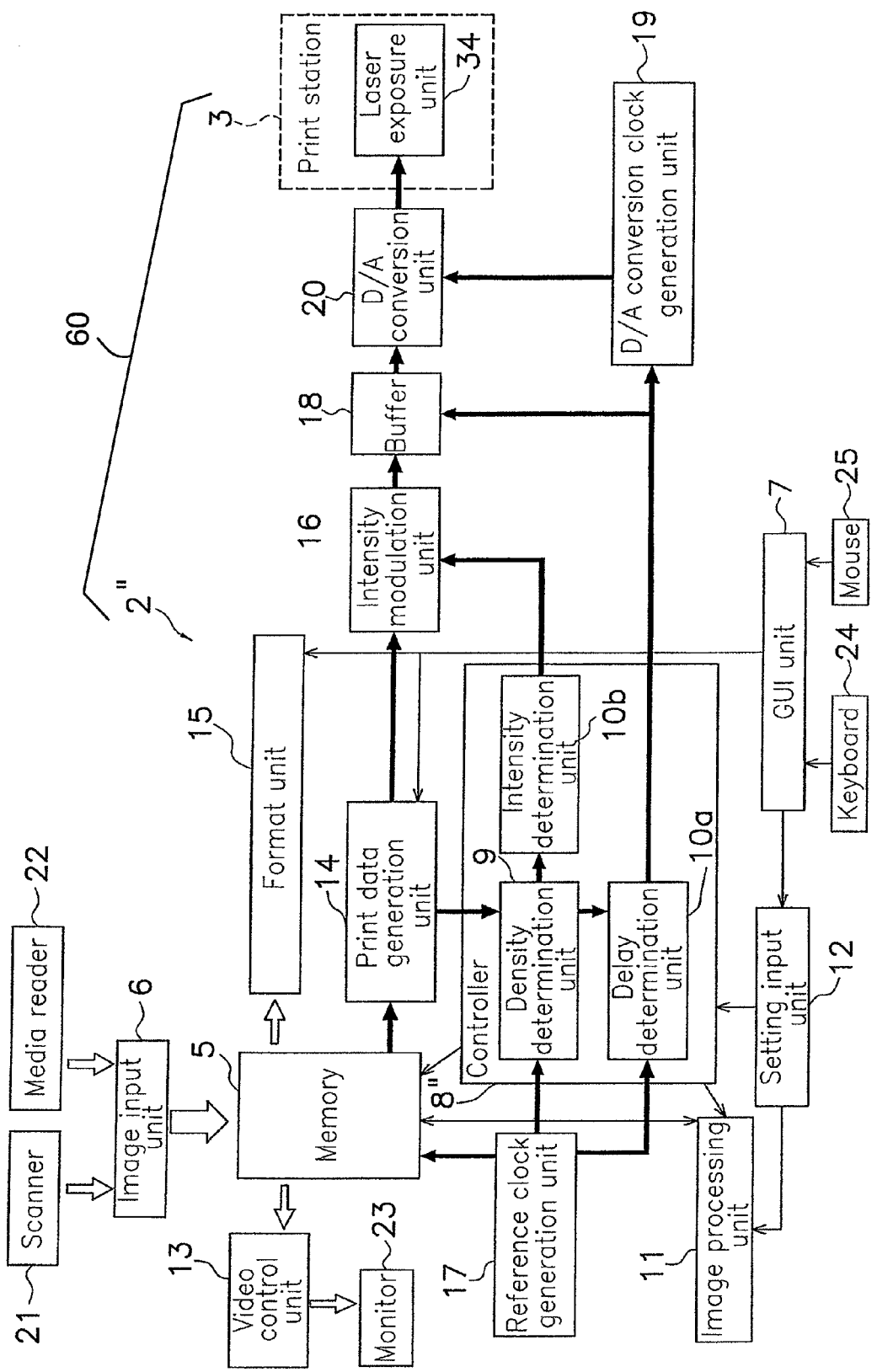
FIG. 9 is a block diagram of a photo-printing system in the third embodiment.

Specifically, as shown in FIG. 9, in the photo-printing system 60 according to the third embodiment, the operation station 2" includes the density determination unit 9 and the delay determination unit 10a of the first embodiment as well as the intensity determination unit 10b of the second embodiment to form a modified controller 8" of the third embodiment. The operation station 2' of the photo-printing system 60 according to the third embodiment further includes the intensity modulation unit 16 of the second embodiment that modulates laser intensity in accordance with the outcome determined by the intensity determination unit 10*b* in order to express the print data. Configurations of the delay determination unit 10*a*, the intensity determination unit 10*b*, and the intensity modulation unit 16 are substantially the same with those in the above-mentioned first and second embodiments, and thus, are given the same reference numerals. Also, a characteristic of the laser exposure unit 34 in which the length of the time required to shift is changed according to the intensity is not changed from the description in the second embodiment (refer to FIG. 8).

The controller 8″ includes the density determination unit 9, the delay determination unit 10*a*, and the intensity determination unit 10*b* to perform the above-mentioned process.

The delay determination unit 10*a* receives the outcome of density determination from the density determination unit 9, and instructs the D/A conversion clock generation unit 19 to generate the D/A conversion clock in accordance with degree of delay in the object pixel. The delay determination unit 10*a* also fine-tunes the generation timing of the D/A conversion clock in accordance with determination outcome of the density difference or density ratio by the density determination unit 9.

The intensity determination unit 10*b* receives the outcome of density determination from the density determination unit 9, and receives the reference clock from the reference clock generation unit 17 to know the process timing. The intensity determination unit 10*b* instructs the intensity modulation unit 16 to modulate data portion related to the intensity such that data related to intensity in the print data has value corresponding to the selected exposure light intensity. The intensity determination unit 10*b* also fine-tunes the intensity modulation of the print data in accordance with the determination outcome of the density difference or density ratio by the determination unit 9.

It should be noted that the controller 8″ adjusts the generation timing of the D/A conversion clock at the delay determination unit 10*a* and adjusts the exposure light intensity at the intensity determination unit 10*b* such that the time required to shift becomes shorter and the exposure to the second pixel is more reliably ensured.

Other structures are substantially the same with those in the above-mentioned first and second embodiments.

Features of the Photo-printing System 60 According to the Third Embodiment (1)

The photo-printing system 60 according to the third embodiment achieves a combination of the features of the photo-printing system 1 according to the first embodiment and the photo-printing system 50 according to the second embodiment. More specifically, when the first pixel is scanned for exposure in the nonlinear light emission region state and then the second pixel having a density equal to or lower than the predetermined density is scanned for exposure in the laser emission region state, the scan-start timing for the second pixel is advanced to sufficiently ensure the exposure time for the second pixel. In addition, the exposure light intensity of the laser exposure unit 34 on the second pixel is increased to shorten the time required to shift.

As a result, advancement of the scan-start timing of the second pixel shortens the scanning time for the first pixel, and shortening of the time required to shift shortens the scanning time for the second pixel. Shortening of both of the scanning time for the first pixel and the scanning time for the second pixel achieves a synergistic effect to further speed up the printing process.

Also, when the second pixel is expressed, the exposure to the second pixel is sufficiently ensured by reducing the effects of the time required to shift of the laser exposure unit 34, so that good image reproducibility data can be maintained.

In summary, compared to the conventional printing process at constant periods, good image reproducibility can be maintained even if the speed of the printing process is further increased.

(2)

Additionally, in the photo-printing system 60 according to the third embodiment, in correspondence with the density difference or density ratio between the first pixel and second pixel, the delay determination unit 10*a* and the intensity determination unit 10*b* fine-tune the generation timing of the D/A conversion clock and the intensity modulation of the print data, respectively. More specifically, as the density difference or density ratio between the first pixel and the second pixel are smaller, the scan-start timing of the second pixel is advanced and the exposure light intensity of the laser exposure unit 34 is increased.

As a result, the scanning time for the first pixel and the scanning time for the second pixel can be shortened in accordance with the density difference or density ratio. The shortening of the scanning time for the first pixel and the shortening of the scanning time for the second pixel achieve a synergistic effect for further shortening.

In summary, good image reproducibility can be maintained even if the speed of the printing process is further increased when the density difference or density ratio between the first pixel and the second pixel is small.

Other Embodiments

The first to third embodiments according to the present invention are described above, but it will be understood that the present invention is not limited to the embodiments disclosed, but is capable of numerous rearrangements, modifications and substitutions without departing from the spirit of the invention as the embodiments shown below.

(A)

In the photo-printing systems 1, 50 and 60 according to the above-mentioned first to third embodiments, the D/A conversion clock generation unit 19 generates D/A conversion clock at the timing delayed from the reference clock, as one example for explanation.

However, the present invention is not limited to these, a timer may be provided for deciding the scan-start timing in accordance with density of each pixel, wherein the D/A conversion clock generation unit 19 is omitted. In this configuration, the same effects with the photo-printing system 1, 50, and 60 in the first to third embodiments can be achieved.

(B)

In the photo-printing system 1, 50, and 60 according to the above-mentioned first to third embodiments, the object pixel for the printing process is changed from white color to chromatic color in particular, as one example for explanation.

However, the printing process according to the present invention is not limited to a case shifting from white color to chromatic color, in particular but can be applied to a case of shifting from light color to dark color.

(C)

In the photo-printing system 50 and 60 of the above-mentioned second and third embodiments, the control is performed to intensify the first half of the pulse signal of the D/A output in particular to express the second pixel, for example, when the first pixel is scanned for exposure in the nonlinear light emission region state and then the second pixel having a density equal to or lower than the predetermined density is scanned for exposure in the laser emission region state.

However, the pulse signal waveform of the D/A output according to the present invention is not limited to the above-mentioned one. For example, a pulse waveform may have the pulse signal whose intensity slowly rises in the first half or have the pulse signal whose intensity is high in the initial portion and slowly goes down in the second half.

However, the case of temporarily intensifying laser exposure light intensity at the initial instant of rising of the pulse signal is preferable, because the time required to shift can be effectively shortened.

(D)

In the photo-printing systems 1, 50, and 60 according to the above-mentioned first to third embodiments, part such as the controllers 8, 8', 8", the print data generation unit 14, the intensity modulation unit 16, the reference clock generation unit 17, the buffer 18, the D/A conversion clock generation unit 19, and the D/A conversion unit 20 are provided not in the print station 3 but in the operation station 2, 2' and 2" as examples for explanation.

However, configurations of the operation station 2 (2' and 2") and the print station 3 are not particularly limited to the above-mentioned ones. For example, any of the above-controllers 8, 8', 8", the print data generation unit 14, the intensity modulation unit 16, the reference clock generation unit 17, the buffer 18, the D/A conversion clock generation unit 19, and the D/A conversion unit 20 may be provided in the print station 3.

More specifically, the print station 3 may include parts such as any of the controllers 8, 8', 8", the print data generation unit 14, the intensity modulation unit 16, the reference clock generation unit 17, the buffer 18, the D/A conversion clock generation unit 19, and the D/A conversion unit 20, and receive various setting from the operation station 2 to perform the printing process.

(E)

In the photo-printing systems 1, 50, and 60 according to the above-mentioned the above-mentioned first to third embodiments, as a premise, the laser exposure unit 34 is not in the state of laser emission region but in the nonlinear light emission region state to express white color or achromatic color. When shifting from the state of nonlinear light emission region to the laser emission region state for scanning exposure, the shortening of the scanning time and the improvement of the reproducibility of the image are achieved.

However, the present invention can be also applied to a following situation, wherein the laser exposure unit 34 includes a plurality of exposure units such as a RED exposure unit, a GREEN exposure unit, and a BLUE exposure unit, and as a state of rising of the printing process according to the present invention, for example, at least any of the exposure units is in a laser emission region to express any chromatic color other than white color and achromatic color. More specifically, the present invention is not limited to a situation where neither the RED exposure unit, the GREEN exposure unit, nor the BLUE exposure unit is in a laser emission region to express white color. In other words, as described above, if any of the exposure units expresses chromatic color and the other exposure unit is shifted from the nonlinear light emission state to the laser emission state, the present invention can be applied to a rising of the other exposure unit.

In the first embodiment, even if any of the exposure units is in a laser emission region, the above-mentioned other exposure unit, taking into account the time required to shift (rise time) of the laser exposure unit 34, advances the scan-start timing of the second pixel so that the time required to shift to express the second pixel to which color of the other exposure unit is related can be started earlier. As a result, time for good image reproducibility is sufficiently ensured.

In the second embodiment, even if any of exposure units are in a laser emission region, the above-mentioned other exposure unit, taking into account time required to shift of the laser exposure unit, increases the exposure light intensity of the laser exposure unit to the second pixel so that time required to shift for expressing the second pixel to which color of the other exposure unit is related can be shortened. As a result, a good image can be reproduced in a short time.

In the third embodiment, even if any of the exposure units is in a laser emission region, the above-mentioned other exposure unit can advance the scan-start timing of the second pixel to sufficiently ensure exposure time to the second pixel, and increase the exposure light intensity of the laser exposure unit to the second pixel to shorten the time required to shift. As a result, it is possible to reproduce the image in a short time and sufficiently ensure time for a massive image.

In summary, even if any of the exposure units is already in a laser emission region and the other exposure unit is shifted into a laser emission region, like the above first to third embodiments, both the speeding up of image formation process and the improvement of the reproducibility of the image are achieved.

The present invention is especially applicable to an image forming apparatus which forms an image by expressing a plurality of pixels in accordance with the image data, because it is possible to maintain good image reproducibility even if the speed of image formation is increased.

In an image forming apparatus according to the first aspect of the present invention, since the scanning time for the second pixel is ensured even if the speed of image formation is increased, good reproducibility of the second pixel is maintained. Accordingly, it is possible to maintain good image reproducibility even if the speed of image formation is increased.

In an image forming apparatus according to the second aspect of the present invention, even if the speed of image formation is increased when the density difference between the first pixel and the second pixel is small, it is possible to maintain good image reproducibility.

In an image forming apparatus according to the third aspect of the present invention, when image formation is performed while receiving the image data, reproduction certainty of each pixel is improved.

In an image forming apparatus according to the fourth aspect of the present invention, it is possible to ensure process time for the decision unit and the delay adjustment unit because the buffer temporarily stores the pixel data to ensure time.

In an image forming apparatus according to the fifth aspect of the present invention, when any of the exposure units performs scanning exposure in the laser emission region state, even if the speed of image formation is increased, it is possible to maintain good image reproducibility in the other exposure unit.

In an image forming apparatus according to the sixth aspect of the present invention, it is possible to maintain good image reproducibility even if the speed of image formation is increased, because good reproducibility of the second pixel is maintained to cope with the speeding up of image formation.

In an image forming apparatus according to the seventh aspect of the present invention, even if the density difference between the first pixel and the second pixel is small, it is possible to further increase the speed of image formation while maintaining good image reproducibility.

In an image forming apparatus according to the eighth aspect of the present invention, when any of the exposure units performs scanning exposure in the laser emission region state, even if the speed of image formation is increased, it is possible to maintain good image reproducibility in the other exposure unit.

In an image forming apparatus according to the ninth aspect of the present invention, since good reproducibility of the second pixel is maintained while ensuring the scanning time for the second pixel even if the speed of image formation is increased, it is possible to maintain good image reproducibility.

In an image forming apparatus according to the tenth aspect of the present invention, as mentioned above, when any of the exposure units performs scanning exposure in the laser emission region state, even if the speed of image formation is increased, it is possible to maintain better image reproducibility in the other exposure unit.

Any terms of degree used herein, such as "substantially", "about" and "approximately", mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An image forming apparatus, comprising:
   a laser exposure unit that performs scanning exposure in a nonlinear light emission region state, and in a laser emission region state that emits laser light;
   a reference clock generation unit for generating a reference clock as a reference for timing the scanning exposure;
   an accepting unit for accepting data on a first pixel to be expressed according to image data, and data on a second pixel to be expressed after the first pixel; and
   a control unit for performing a first control that controls each of the scan-start timings of the first pixel and the second pixel in accordance with the reference clock if scanning exposure is performed on the first pixel and the second pixel in the laser emission region state, and performing a second control to advance the scan-start timing of the second pixel with respect to the first control if scanning exposure is performed on the first pixel in the nonlinear light emission region state and scanning exposure is performed on the second pixel having a density equal to or lower than a predetermined density in the laser emission region state that takes a longer rise time from the nonlinear light emission region state to the laser emission region state compared to a case in which there is a sufficient density difference between the first pixel and the second pixel.

2. An image forming apparatus comprising:
   a laser exposure unit that performs scanning exposure in a nonlinear light emission region state, and in a laser emission region state that emits laser light;
   a reference clock generation unit for generating a reference clock as a reference for timing the scanning exposure;
   an accepting unit for accepting data on a first pixel to be expressed according to image data, and data on a second pixel to be expressed after the first pixel; and
   a control unit for performing a first control that controls each of the scan-start timings of the first pixel and the second pixel in accordance with the reference clock if scanning exposure is performed on the first pixel and the second pixel in the laser emission region state, and performing a second control to advance the scan-start timing of the second pixel with respect to the first control if scanning exposure is performed on the first pixel in the nonlinear light emission region state and scanning exposure is performed on the second pixel having a density equal to or lower than a predetermined density in the laser emission region state,
   the control unit performing the second control to further advance the scan-start timing of the second pixel as the difference between the first pixel density and the second pixel density becomes smaller.

3. An image forming apparatus according to claim 1, further comprising
   a delay clock generation unit for generating a delay clock at a timing that is delayed from the generation timing of the reference clock; and
   the control unit controls the delay clock generation unit to generate the delay clock so that the delay from the generation timing of the reference clock is lower when the second pixel is expressed in the second control.

4. An image forming apparatus according to claim 1, further comprising:
   a decision unit for deciding whether or not the difference in the density that is based on the first pixel data and the second pixel data is less than or equal to a predetermined value;
   a delay adjustment unit for adjusting the degree of delay in a delay clock in accordance with the decision by the decision unit; and
   a buffer for temporarily storing the first pixel data and the second pixel data.

5. An image forming apparatus according to claim 1, wherein
   the laser exposure unit includes at least a RED laser exposure unit, a GREEN laser exposure unit, and a BLUE laser exposure unit;
   wherein when performing scanning exposure by one or two of the exposure units in the laser emission region state and shifting one of the one or two exposure units not in the laser emission region state from the nonlinear light emission region state to the laser emission region state for scanning exposure, the control unit performs a control operation to advance the scan-start timing of the second pixel with respect to the first control if the other exposure unit performs scanning exposure on the first pixel in the nonlinear light emission region state and performs scanning exposure on the second pixel having a density equal to or lower than the predetermined density in the laser emission region state.

6. An image forming apparatus comprising:
   a laser exposure unit that performs scanning exposure in a nonlinear light emission region state and in a laser emission region state that emits laser light;
   a reference clock generation unit for generating reference clock as a reference for timing the scanning exposure;

an accepting unit for accepting data on a first pixel to be expressed according to image data and data on a second pixel to be expressed after the first pixel; and a control unit for performing a first control to control exposure light intensity of the laser exposure unit in accordance with first pixel data and second pixel data if scanning exposure is performed on the first pixel and the second pixel in the laser emission region state, and a second control to at least temporarily increase the exposure light intensity of the laser exposure unit to the second pixel with respect to the first control if scanning exposure is performed on the first pixel in the nonlinear light emission region state and scanning exposure is performed on the second pixel having a density equal to or lower than a predetermined density in the laser emission region state.

7. An image forming apparatus according to claim 6, wherein the control unit performs the second control to further increase the exposure light intensity of the laser exposure unit to the second pixel as the difference between the first pixel density and the second pixel density becomes smaller.

8. An image forming apparatus according to claim 6, wherein the laser exposure unit includes at least a RED laser exposure unit, a GREEN laser exposure unit, and a BLUE laser exposure unit;

wherein when performing scanning exposure by one or two of the exposure units in the laser emission region state and shifting one of the one or two exposure units not in the laser emission region state from the nonlinear light emission region state to the laser emission region state that performs scanning exposure, the control unit performs a control operation to at least temporarily increase the exposure light intensity of the other laser exposure unit on the second pixel with respect to the first control if the other exposure unit performs scanning exposure on the first pixel in the nonlinear light emission region state, and performs scanning exposure on the second pixel having a density equal to or lower than the predetermined density in the laser emission region state.

9. An image forming apparatus comprising:

a laser exposure unit that performs scanning exposure in a nonlinear light emission region state and in a laser emission region state that emits laser light;

a reference clock generation unit for generating a reference clock as a reference for timing the scanning exposure;

an accepting unit for accepting data on a first pixel to be expressed according to image data and data on a second pixel to be expressed after the first pixel; and a control unit for performing a first control to control each scan-start timing of the first pixel and the second pixel in accordance with the reference clock and to control the light exposure intensity of the laser exposure unit in accordance with first pixel data and second pixel data if scanning exposure is performed on the first pixel and the second pixel in the laser emission region state, and a second control to advance the scan-start timing of the second pixel and to at least temporarily increase the exposure light intensity of the laser exposure unit on the second pixel with respect to the first control if scanning exposure is performed on the first pixel in the nonlinear light emission region state, and scanning exposure is performed on the second pixel having a density equal to or lower than a predetermined density in the laser emission region state.

10. An image forming apparatus according to claim 9, wherein the laser exposure unit includes at least a RED laser exposure unit, a GREEN laser exposure unit, and a BLUE laser exposure unit;

wherein when performing scanning exposure by one or two of the exposure units in the laser emission region state and shifting one of the one or two exposure units not in the laser emission region state from the nonlinear light emission region state into the laser emission region state that performs scanning exposure, the control unit performs a control operation to advance the scan-start timing of the second pixel and to at least temporarily increase the light exposure intensity of the other laser exposure unit on the second pixel with respect to the first control if the other exposure unit performs scanning exposure on the first pixel in the nonlinear light emission region state and performs scanning exposure on the second pixel having a density equal to or lower than the predetermined density in the laser emission region state.

* * * * *